United States Patent
Guedalia et al.

(10) Patent No.: US 10,659,246 B2
(45) Date of Patent: *May 19, 2020

(54) METHODS TO DISCOVER, CONFIGURE, AND LEVERAGE RELATIONSHIPS IN INTERNET OF THINGS (IOT) NETWORKS

(71) Applicant: QUALCOMM Incorporated, San Diego, CA (US)

(72) Inventors: Isaac David Guedalia, Beit-Shemesh (IL); Jacob Guedalia, New York, NY (US); Ravinder Paul Chandhok, Del Mar, CA (US); Sarah Harris Glickfield, St. Louis, MO (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/817,275

(22) Filed: Nov. 19, 2017

(65) Prior Publication Data

US 2018/0097651 A1 Apr. 5, 2018
US 2020/0119939 A9 Apr. 16, 2020

Related U.S. Application Data

(63) Continuation of application No. 14/187,102, filed on Feb. 21, 2014, now Pat. No. 9,900,171.
(Continued)

(51) Int. Cl.
*H04L 12/24* (2006.01)
*H04L 12/28* (2006.01)
(Continued)

(52) U.S. Cl.
CPC .......... *H04L 12/2803* (2013.01); *H04L 67/12* (2013.01); *H04L 67/16* (2013.01);
(Continued)

(58) Field of Classification Search
CPC .................. H04L 41/0876; H04L 41/0893
(Continued)

(56) References Cited

U.S. PATENT DOCUMENTS

| 7,117,051 B2 | 10/2006 | Landry et al. |
| 8,280,009 B2 | 10/2012 | Stepanian |

(Continued)

FOREIGN PATENT DOCUMENTS

| CN | 102546327 A | 7/2012 |
| EP | 2547040 A1 | 1/2013 |

(Continued)

OTHER PUBLICATIONS

Atzori L., et al., "The Social Internet of Things (SIoT)—When Social Networks meet the Internet of Things: Concept, Architecture and Network Characterization," Nov. 2012, vol. 56 (16), pp. 3594-3608.

(Continued)

*Primary Examiner* — Moustafa M Meky
*Assistant Examiner* — Elizabeth Kassa
(74) *Attorney, Agent, or Firm* — Muncy, Geissler, Olds & Lowe, P.C.

(57) ABSTRACT

The disclosure generally relates to various methods to discover, configure, and leverage relationships in Internet of Things (IoT) networks. More particularly, the methods disclosed herein may support automated processes to create configurable sub-divisions and access controls in an IoT network based on usage associated with objects that are registered in the IoT network and interactions among the registered objects. Furthermore, in one embodiment, relationships between IoT devices that belong to different users may be implicitly discovered and/or ranked based on meetings (e.g., interactions) between the IoT devices, and relationships between the different users may likewise be (Continued)

implicitly discovered and/or ranked. Moreover, locations and interactions associated with IoT devices may be tracked over time to further discover user-specific and potentially asymmetric relationships among the IoT devices and/or the users associated therewith (e.g., where one user considers another user a close friend and the other user considers the first user an acquaintance).

26 Claims, 22 Drawing Sheets

Related U.S. Application Data

(60) Provisional application No. 61/769,130, filed on Feb. 25, 2013, provisional application No. 61/769,145, filed on Feb. 25, 2013, provisional application No. 61/901,844, filed on Nov. 8, 2013, provisional application No. 61/910,203, filed on Nov. 29, 2013.

(51) Int. Cl.
| | |
|---|---|
| *H04L 29/08* | (2006.01) |
| *H04W 4/08* | (2009.01) |
| *H04W 84/18* | (2009.01) |
| *H04W 4/21* | (2018.01) |
| *H04W 4/70* | (2018.01) |
| *G06N 20/00* | (2019.01) |
| *H04W 4/02* | (2018.01) |
| *G06N 5/04* | (2006.01) |
| *H04W 4/029* | (2018.01) |
| *H04W 4/80* | (2018.01) |

(52) U.S. Cl.
CPC ............. *H04W 4/08* (2013.01); *H04W 4/21* (2018.02); *H04W 4/70* (2018.02); *H04W 84/18* (2013.01); *G06N 5/043* (2013.01); *G06N 20/00* (2019.01); *H04W 4/023* (2013.01); *H04W 4/027* (2013.01); *H04W 4/029* (2018.02); *H04W 4/80* (2018.02)

(58) Field of Classification Search
USPC ....................................................... 709/224
See application file for complete search history.

(56) References Cited

U.S. PATENT DOCUMENTS

| 8,374,104 | B2* | 2/2013 | Gauweiler ........ H04L 29/12254 |
| | | | 370/255 |
| 8,495,072 | B1 | 7/2013 | Kapoor et al. |
| 9,723,109 | B2 | 8/2017 | Hertel et al. |
| 2003/0229900 | A1* | 12/2003 | Reisman ........... G06F 17/30873 |
| | | | 725/87 |
| 2009/0006469 | A1 | 1/2009 | Jain et al. |
| 2009/0164450 | A1* | 6/2009 | Martinez .......... G06F 17/30864 |
| 2009/0170431 | A1* | 7/2009 | Pering ..................... H04B 5/02 |
| | | | 455/41.1 |
| 2010/0228767 | A1 | 9/2010 | Slinker et al. |
| 2011/0081860 | A1* | 4/2011 | Brown ............... H04N 1/00347 |
| | | | 455/41.3 |
| 2011/0161478 | A1 | 6/2011 | Formo et al. |
| 2011/0218992 | A1* | 9/2011 | Waldman ........... G01C 21/3617 |
| | | | 707/724 |
| 2011/0264596 | A1* | 10/2011 | Shifflett ................. G06Q 30/02 |
| | | | 705/319 |
| 2011/0314168 | A1* | 12/2011 | Bathiche ................ H04W 4/21 |
| | | | 709/228 |
| 2012/0079092 | A1 | 3/2012 | Woxblom et al. |
| 2012/0102050 | A1 | 4/2012 | Button et al. |
| 2012/0108230 | A1* | 5/2012 | Stepanian ............... G06F 21/10 |
| | | | 455/422.1 |
| 2012/0143355 | A1* | 6/2012 | Honma ............... H04L 12/2807 |
| | | | 700/17 |
| 2013/0012220 | A1 | 1/2013 | Waris et al. |
| 2013/0080898 | A1* | 3/2013 | Lavian ..................... G06F 3/16 |
| | | | 715/728 |
| 2013/0191688 | A1 | 7/2013 | Agarwal et al. |
| 2013/0212028 | A1 | 8/2013 | Delhaes |
| 2014/0108792 | A1 | 4/2014 | Borzycki et al. |
| 2014/0129734 | A1 | 5/2014 | Vasseur et al. |
| 2014/0176310 | A1 | 6/2014 | Kotlicki |
| 2014/0244834 | A1 | 8/2014 | Guedalia et al. |
| 2017/0324843 | A1 | 11/2017 | Hertel et al. |

FOREIGN PATENT DOCUMENTS

| JP | 2010199871 A | 9/2010 |
| TW | M430668 U | 6/2012 |
| TW | 201233223 A | 8/2012 |
| TW | 201246998 A | 11/2012 |
| TW | 201250634 A | 12/2012 |
| WO | 2011134318 A1 | 11/2011 |
| WO | 2012094520 A2 | 7/2012 |
| WO | 2013086059 A1 | 6/2013 |

OTHER PUBLICATIONS

Guo B., et al., "From the internet of things to embedded intelligence," 2012, pp. 1-29.

International Search Report and Written Opinion—PCT/US2014/018369—ISA/EPO—dated May 21, 2014.

Keoh, S., et al., "Securing the IP-based Internet of Things with DTLS," LWIG Working Group, Internet-Draft, Feb. 18, 2013, pp. 1-17.

Taiwan Search Report—TW103106319—TIPO—dated Oct. 29, 2015.

* cited by examiner

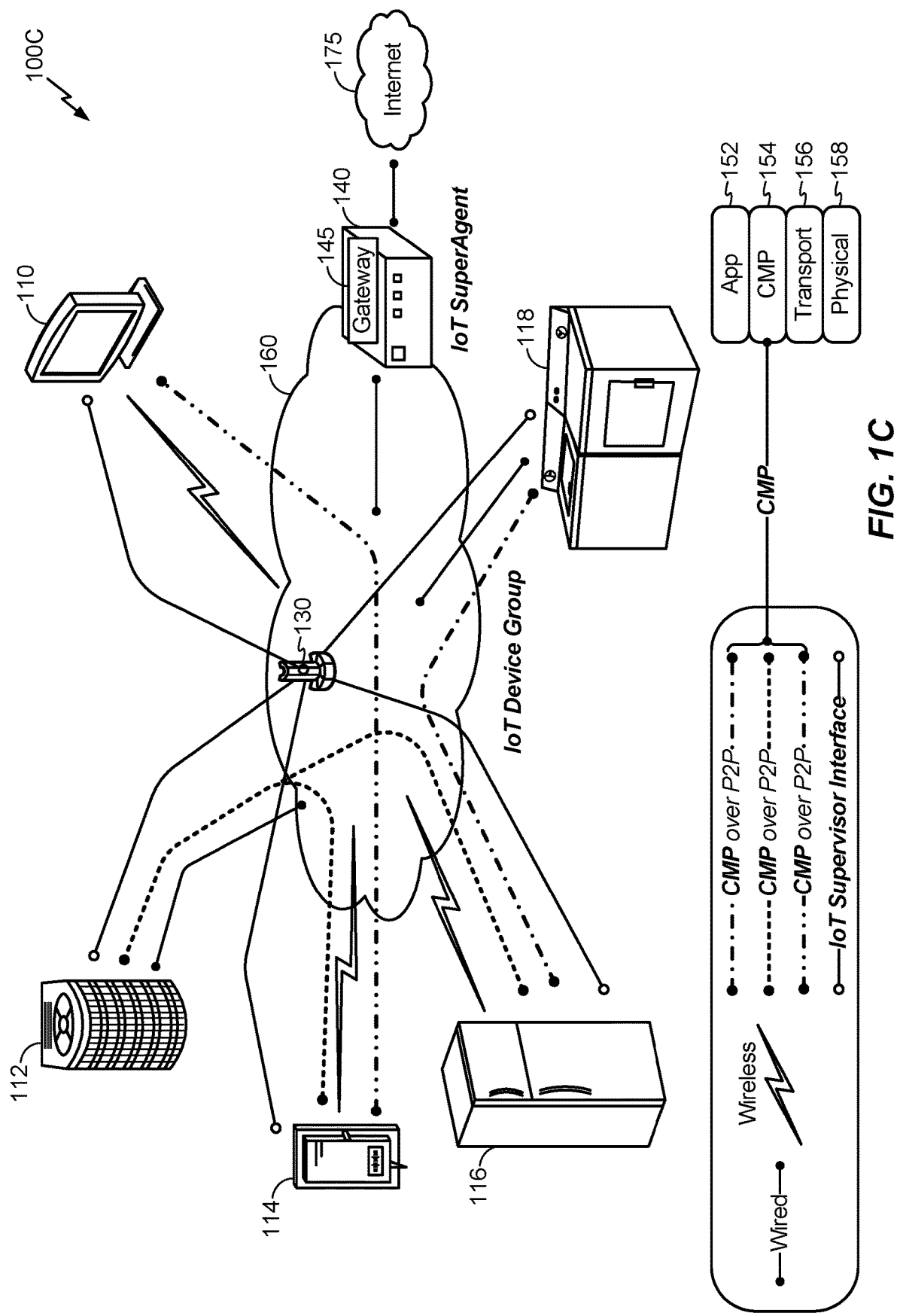

METHODS TO DISCOVER, CONFIGURE, AND LEVERAGE RELATIONSHIPS IN INTERNET OF THINGS (IOT) NETWORKS

CROSS-REFERENCE TO RELATED APPLICATIONS

The present application for patent is a continuation of U.S. patent application Ser. No. 14/187,102 entitled "METHODS TO DISCOVER, CONFIGURE, AND LEVERAGE RELATIONSHIPS IN INTERNET OF THINGS (IOT) NETWORKS," filed Feb. 21, 2014, which claims the benefit of U.S. Provisional Patent Application No. 61/769,130 entitled "AN IMPLICIT METHOD FOR CREATING RELATIONSHIPS BETWEEN INTERNET OF THINGS (IOT) DEVICE," filed Feb. 25, 2013, U.S. Provisional Patent Application No. 61/769,145 entitled "AUTOMATIC AND CONFIGURABLE INTERNET OF THINGS NETWORK SUB-DIVISION," filed Feb. 25, 2013, U.S. Provisional Patent Application No. 61/901,844 entitled "METHOD TO DISCOVER ASYMMETRIC RELATIONSHIPS AMONG INTERNET OF THINGS (IOT) DEVICES," filed Nov. 8, 2013, and U.S. Provisional Patent Application No. 61/910,203 entitled "AN IMPLICIT METHOD FOR CREATING RELATIONSHIPS BETWEEN INTERNET OF THINGS (IOT) DEVICES," filed Nov. 29, 2013, each assigned to the assignee hereof and hereby expressly incorporated herein by reference in its entirety.

TECHNICAL FIELD

Various embodiments described herein generally relate to discovering, configuring, and leveraging relationships in Internet of Things (IoT) networks.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, the disclosure relates to mechanisms that may be used to automatically create configurable sub-divisions in an Internet of Things (IoT) network that includes various devices and/or other physical objects. For example, in various embodiments, the devices and/or other physical objects in the IoT network may include, among other things, one or more IoT devices having communication capabilities, non-IoT devices having communication capabilities, and/or other physical objects that do not have communication capabilities. In one embodiment, in response to detecting and registering the devices and/or other physical objects into the IoT network, a supervisor device may be configured to monitor interactions and usage associated therewith and create one or more groups associated with the IoT network. For example, the one or more groups may generally define one or more sub-networks within the IoT network that organize the registered devices and/or other physical objects into certain sub-networks. In one embodiment, the one or more groups associated with the IoT network may then be presented via a user interface (e.g., on the supervisor device), which may allow a user to provide one or more commands to control or otherwise configure the IoT network. For example, in one embodiment, the one or more commands may be used to customize the groups associated with the IoT network and control access to certain groups, subsets, or other sub-networks associated with the IoT network, among other things.

According to another exemplary aspect, the disclosure relates to mechanisms that may be used to implicitly create relationships between IoT devices. In one aspect, a first IoT device that belongs to a first user may detect a current interaction with a second IoT device that belongs to a second user and then determine whether or not to update a relationship rank associated with the second IoT device based on attributes associated with the current interaction. Additionally, in response to determining that one or more previous interactions have occurred between the first IoT device and the second IoT device, the first IoT device may further determine whether or not update the relationship rank associated with the second IoT device based on the attributes associated with the current interaction in combination with one or more attributes associated with the previous interactions between the IoT devices. Furthermore, in response to the first IoT device determining that the relationship rank associated with the second IoT device should be updated, then the first IoT may device update the relationship rank accordingly (e.g., upgrading the relationship from friend to family, downgrading the relationship from friend to acquaintance, etc.). In one embodiment, the first IoT device may further determine whether or not the second IoT device is requesting access to an IoT device belonging to the first user (e.g., the first IoT device or some other IoT device that belongs to the first user), wherein if the second IoT device is requesting access, the first IoT device may determine whether to grant or deny the requested access based on the relationship rank assigned to the second IoT device.

According to another exemplary aspect, the disclosure relates to mechanisms that may be used to implicitly assign relationships between users in an IoT network, wherein an interaction between a first IoT device that belongs to a first user and a second IoT device that belongs to a second user may be detected (e.g., while the first IoT device and the second IoT device are located in proximity to each other). As such, in one embodiment, the first IoT device may then store information related to the interaction in a local interaction table and assign a relationship identifier to the second user associated with the second IoT device based, at least in part, on the stored information related to the interaction and/or one or more previous interactions between IoT devices associated with the first user (e.g., the first IoT device and/or other IoT devices that belong to the first user) and one or more IoT devices associated with the second user (e.g., the second IoT device and/or other IoT devices that belong to the second user). Furthermore, in one embodiment, a server may detect the interactions between the first IoT device and the second IoT device based on location information related to the interactions, which the server may receive from the first IoT device and/or the second IoT device, wherein the interactions used to assign the relationship identifier may comprise interactions that occur within a threshold time period, at substantially the same time, and/or at substantially the same location, interactions that have a threshold duration, a threshold frequency, and/or substantially the same type, or interactions that meet other suitable criteria.

According to another exemplary aspect, the disclosure relates to mechanisms that may be used to track locations and interactions associated with various IoT devices in order to discover user-specific and potentially asymmetric relationships among the IoT devices. In particular, relationships are typically complex and co-incidence occurrences (e.g., in certain locations, at certain times, etc.) may not always indicate an actual relationship between different users. For example, two people may frequently interact with one another but still not be friends. Additionally, some relationships may be asymmetric, wherein a relationship among certain users may be classified differently from one user to another. Accordingly, locations, interactions, usage, and other relevant state data associated with various IoT devices may be tracked to deduce asymmetric relationships among different users, which may be used to control subsequent interactions among the IoT devices. Furthermore, in one embodiment, tracking the users who own the locations where particular interactions occur may be used to derive further information about the relationships between different users. For example, in one embodiment, various registered IoT devices may send data relating to locations and interactions associated therewith to a server, which may track the locations associated with the IoT devices and the interactions among the IoT devices and incrementally process the tracked location and interaction data received from each IoT device at certain intervals to identify similar and/or different usage patterns, location co-incidence, or other relevant similarities and/or differences that may provide knowledge or other insight into the relationships among various users. The location and interaction data received in a current tracking period may be pre-processed to identify similar patterns or location overlaps among various IoT devices (e.g., on a daily basis or according to another periodic interval), whereby the location and interaction data tracked in any particular period may incrementally build upon the location and interaction data that was tracked in one or more previous tracking periods. Furthermore, to avoid acting upon stale data and place greater importance on more recent locations and more recent interactions, the location and interaction data from the previous tracking periods may be limited to location and interaction data determined within a particular time period (e.g., within the last month). The server may then use the pre-processed location and interaction data from the current tracking period (and/or any previously processed location and interaction data from previous tracking periods) to cluster the location and interaction data into dominant groups according to suitable statistical techniques. The clustered relationship data may then be analyzed to derive user-specific cluster representations, which may be used to assign user-specific relationship identifiers among the tracked IoT devices (and the users associated therewith). For example, in one embodiment, the location associated with each input may be plotted on a derived x-axis and y-axis and the user-specific cluster representations may be plotted using a suitable graphing utility that can be viewed and analyzed to help learn and classify the relationships among the tracked IoT devices and the users associated therewith, including any asymmetry therebetween.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIGS. 1A-1E illustrates exemplary high-level system architectures of a wireless communications system, according to various aspects of the disclosure.

FIG. 2A illustrates an exemplary Internet of Things (IoT) device, according to various aspects of the disclosure, while

FIG. 12A illustrates an exemplary architecture that may be used to discover, configure, and leverage relationships in IoT networks, while

DETAILED DESCRIPTION

Figure 1A:
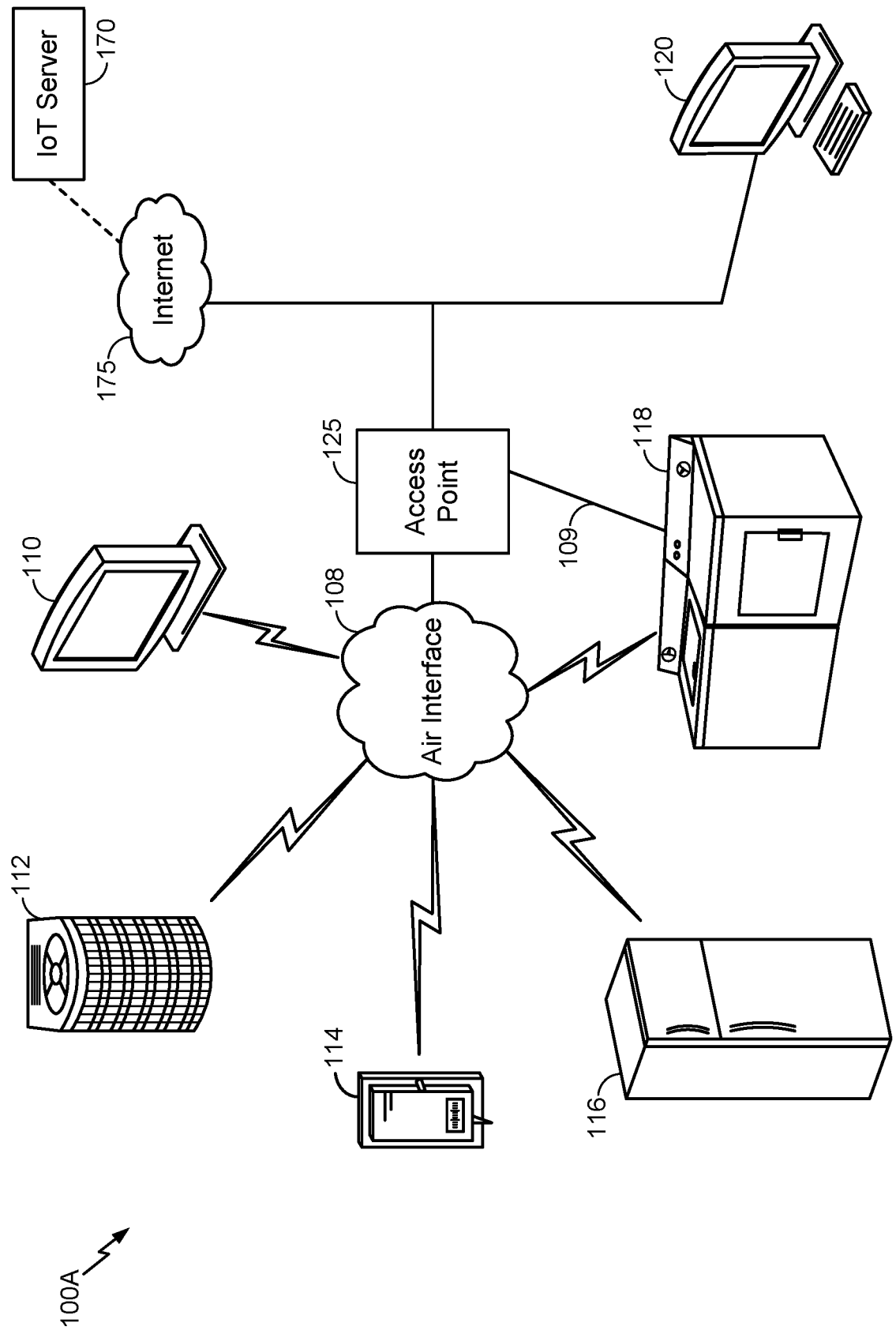

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
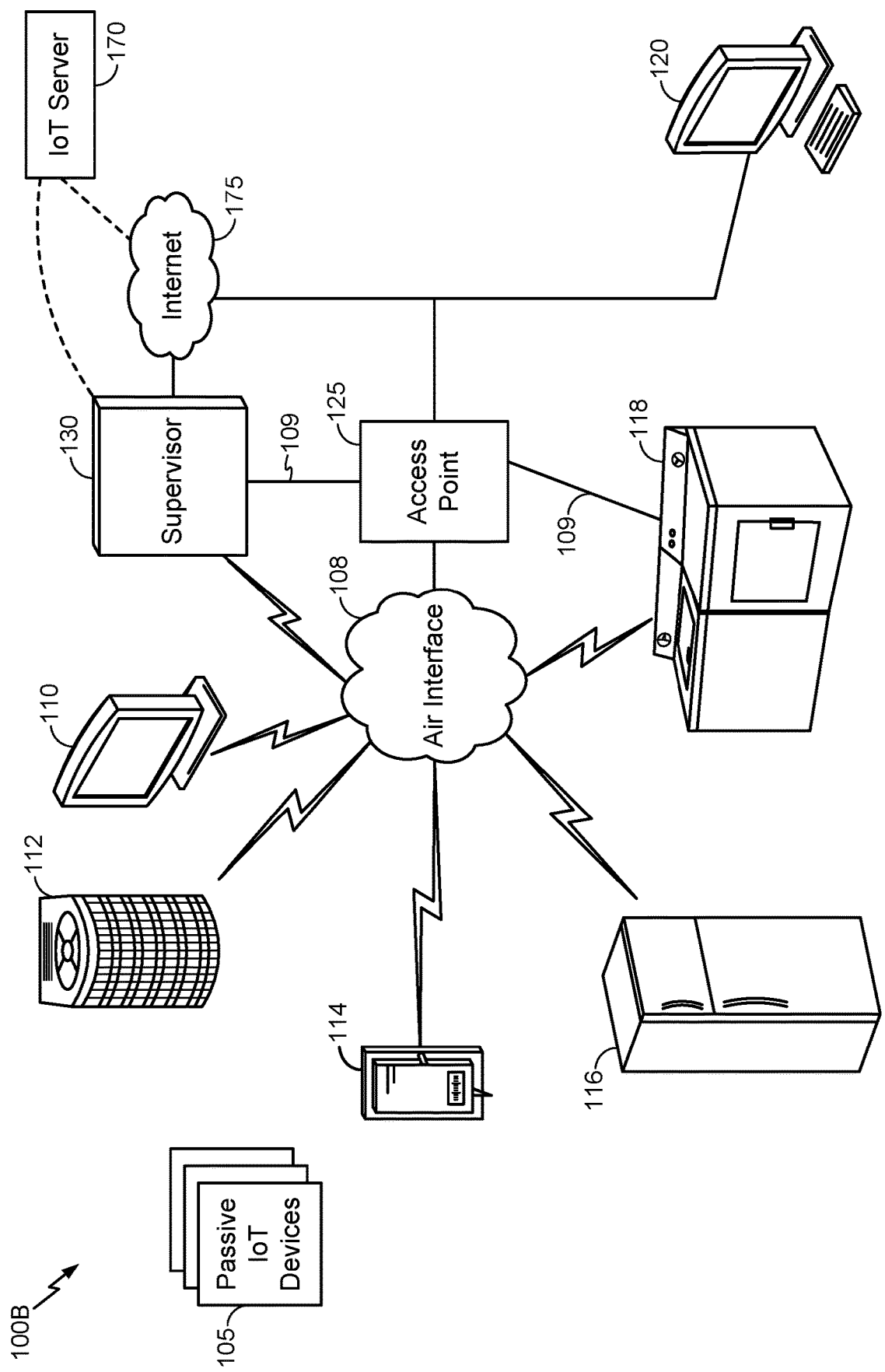

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
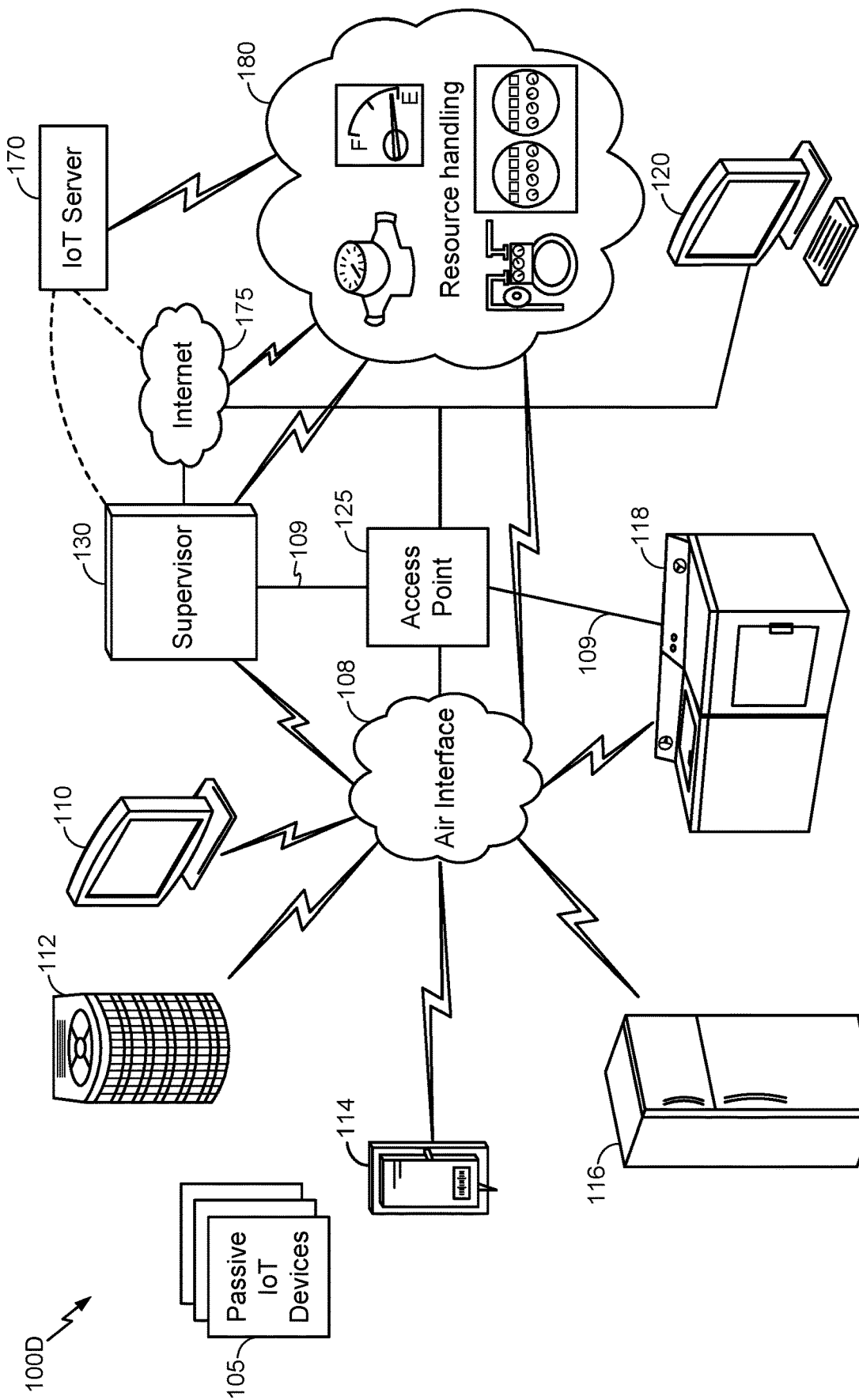

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
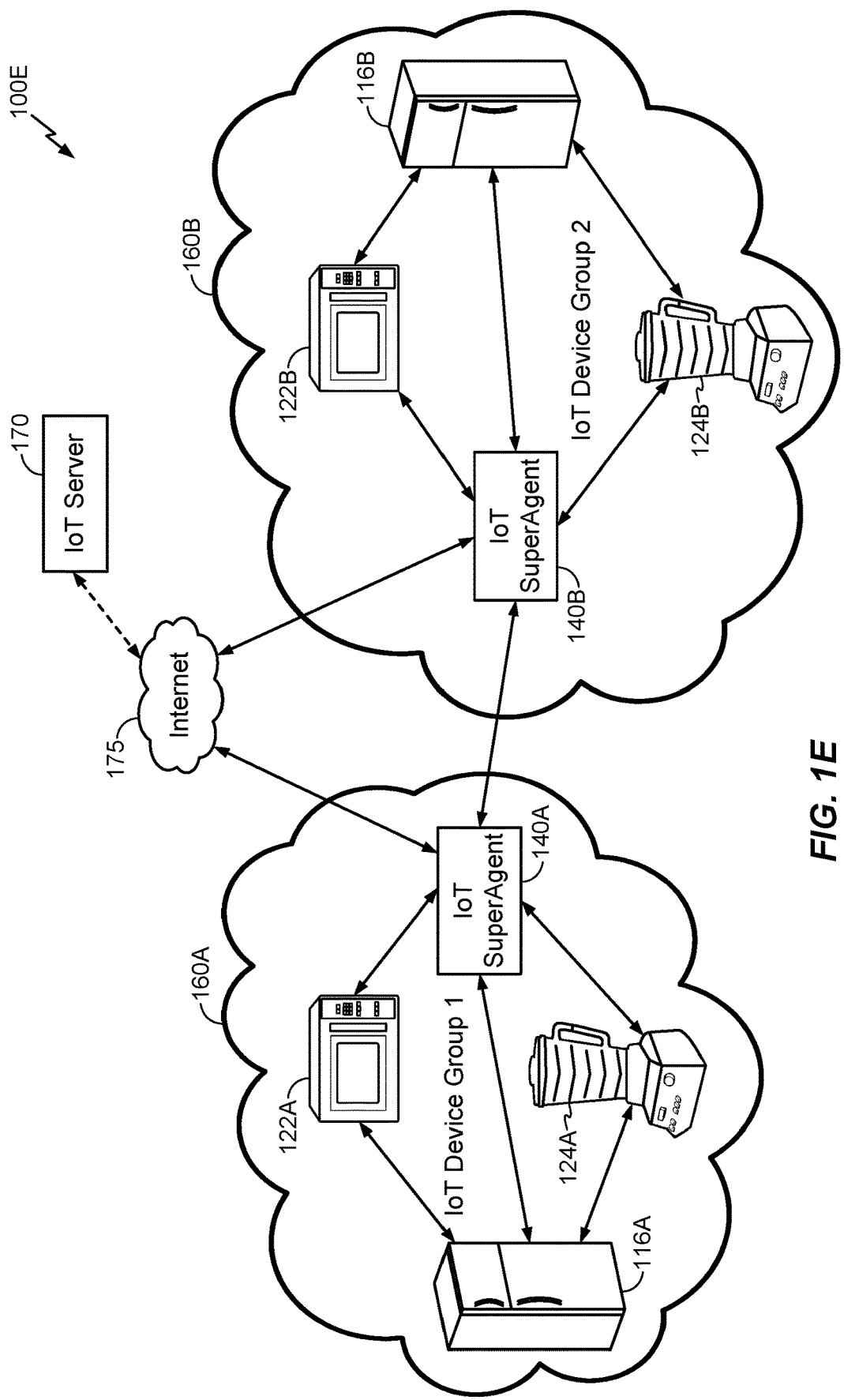

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
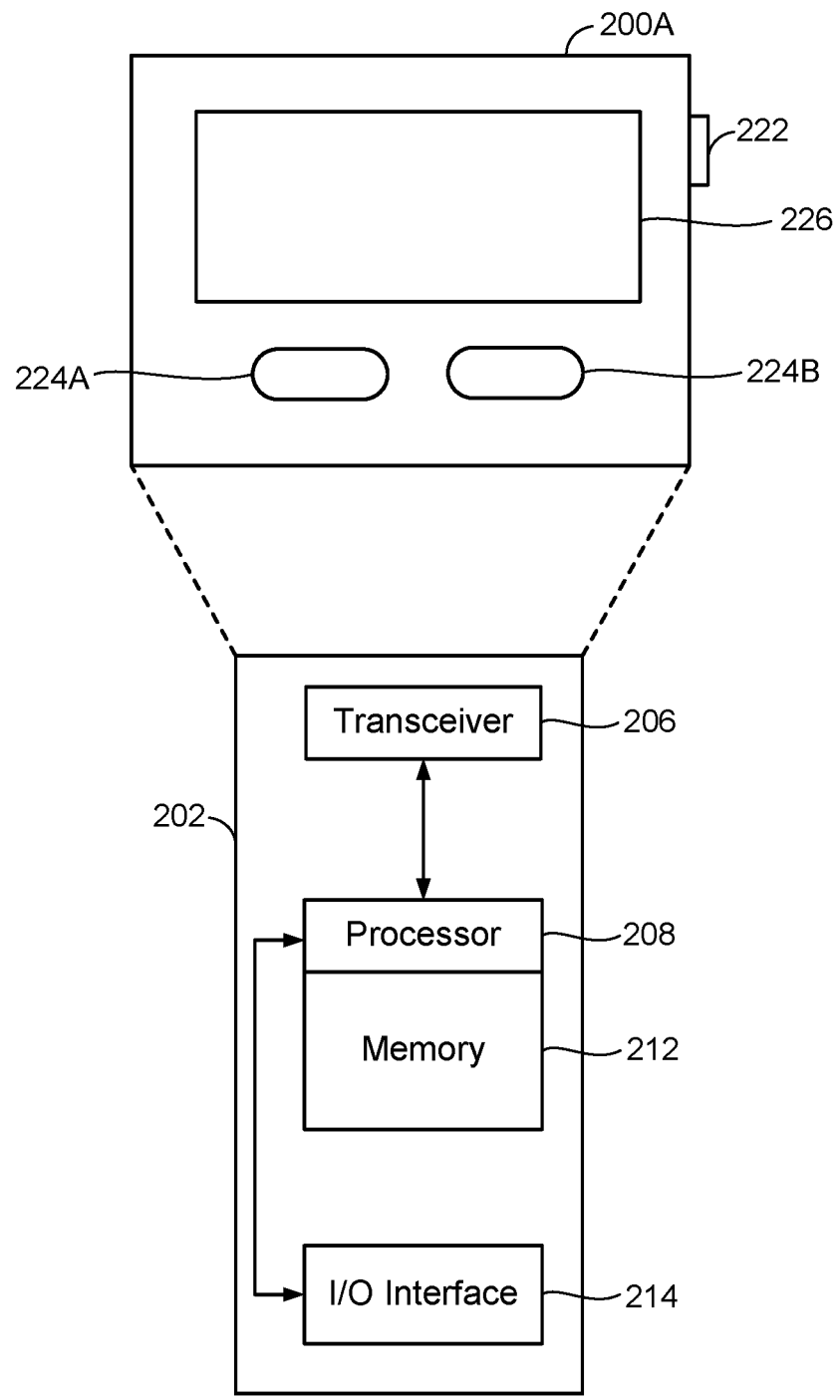

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
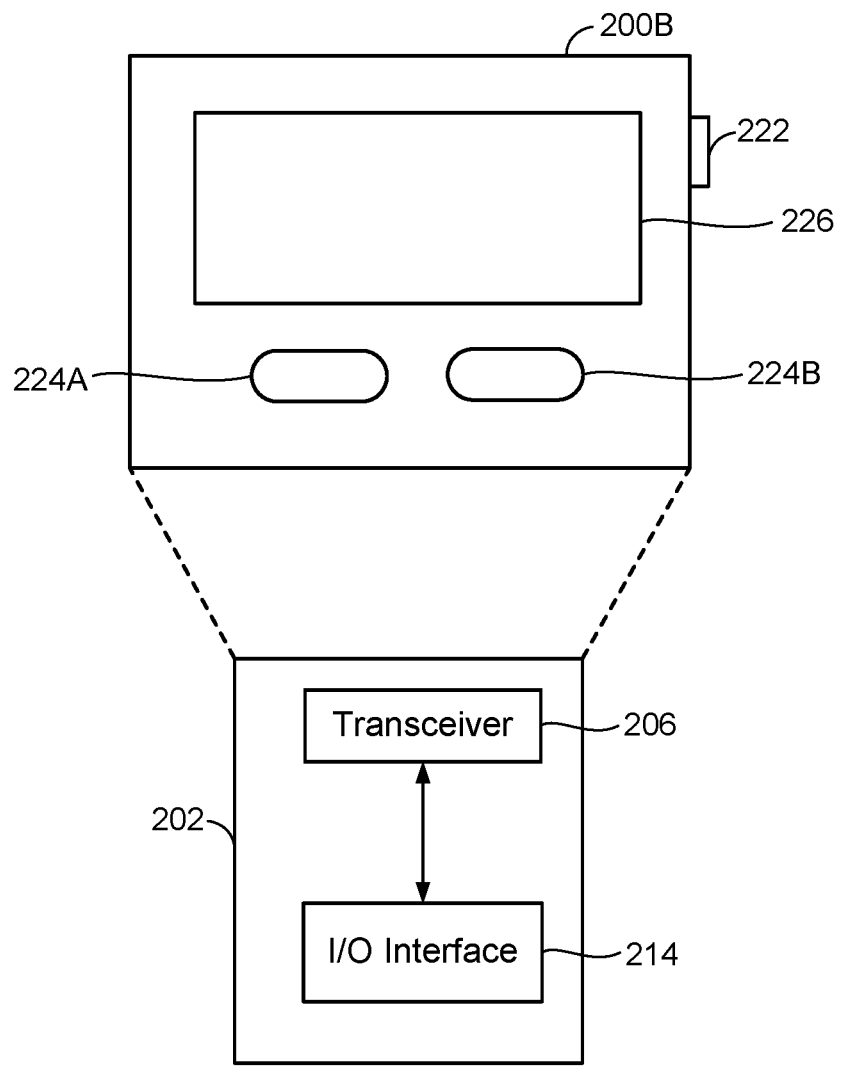
FIG. 2B illustrates an exemplary passive IoT device, according to various aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
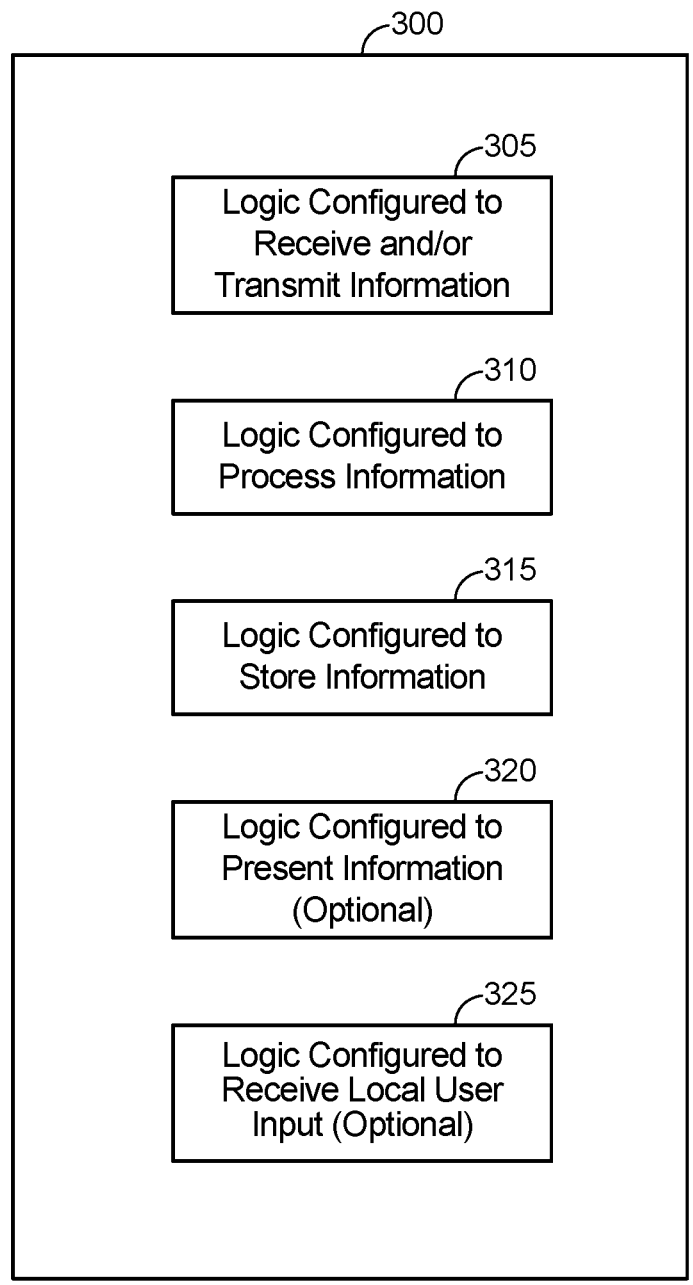
FIG. 3 illustrates an exemplary communication device that includes logic configured to perform functionality, according to various aspects of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
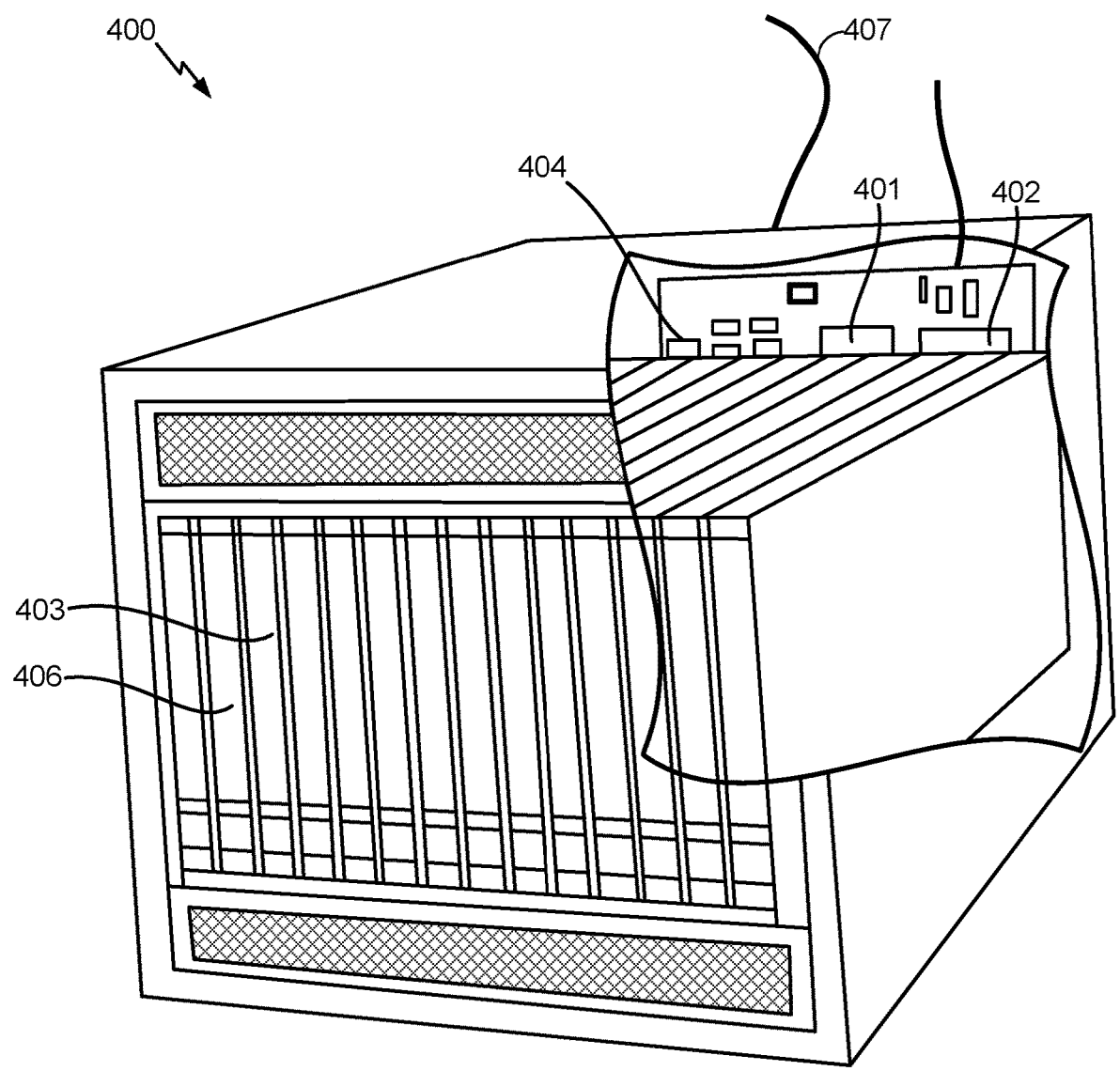
FIG. 4 illustrates an exemplary server, according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet. In general, with the development and increasing prevalence of the IoT, numerous proximate heterogeneous IoT devices and other physical objects that have different types and perform different activities (e.g., lights, printers, refrigerators, air conditioners, etc.) may interact with one another in many different ways and be used in many different ways. As such, due to the potentially large number of heterogeneous IoT devices and other physical objects that may be in use within a controlled IoT network, well-defined and reliable communication interfaces may generally be needed in order to enable the various heterogeneous IoT devices to communicate with one another and exchange information. Accordingly, the following description provided in relation to FIGS. 5-7 generally outlines an exemplary communication framework that may support discoverable peer-to-peer (P2P) services to enable communication among the IoT devices according to the various aspects and embodiments disclosed herein.

Figure 5:
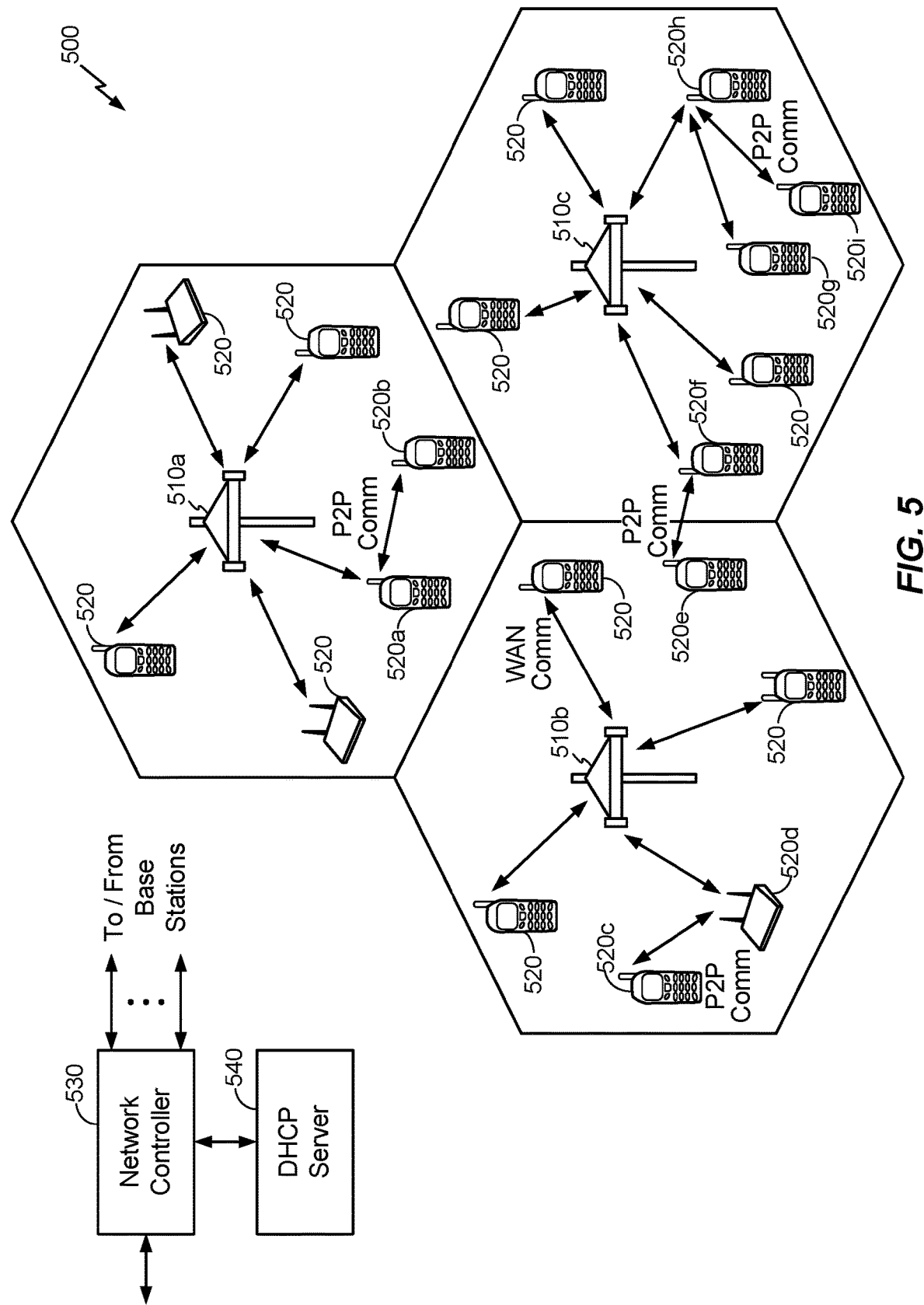
FIG. 5 illustrates a wireless communication network that may support discoverable peer-to-peer (P2P) services, according to one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
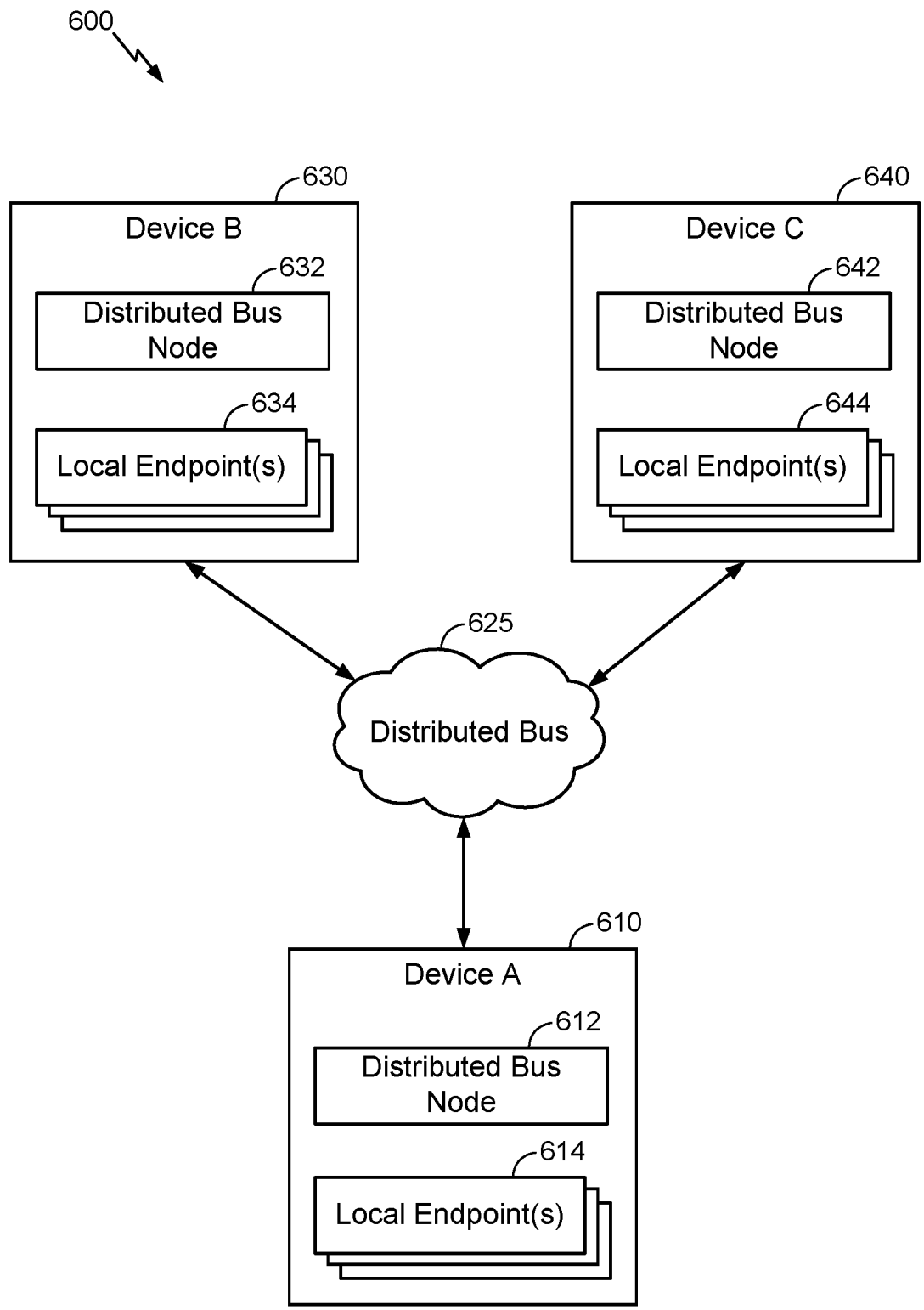
FIG. 6 illustrates an exemplary environment in which discoverable P2P services may be used to establish a proximity-based distributed bus over which various devices may communicate, according to one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
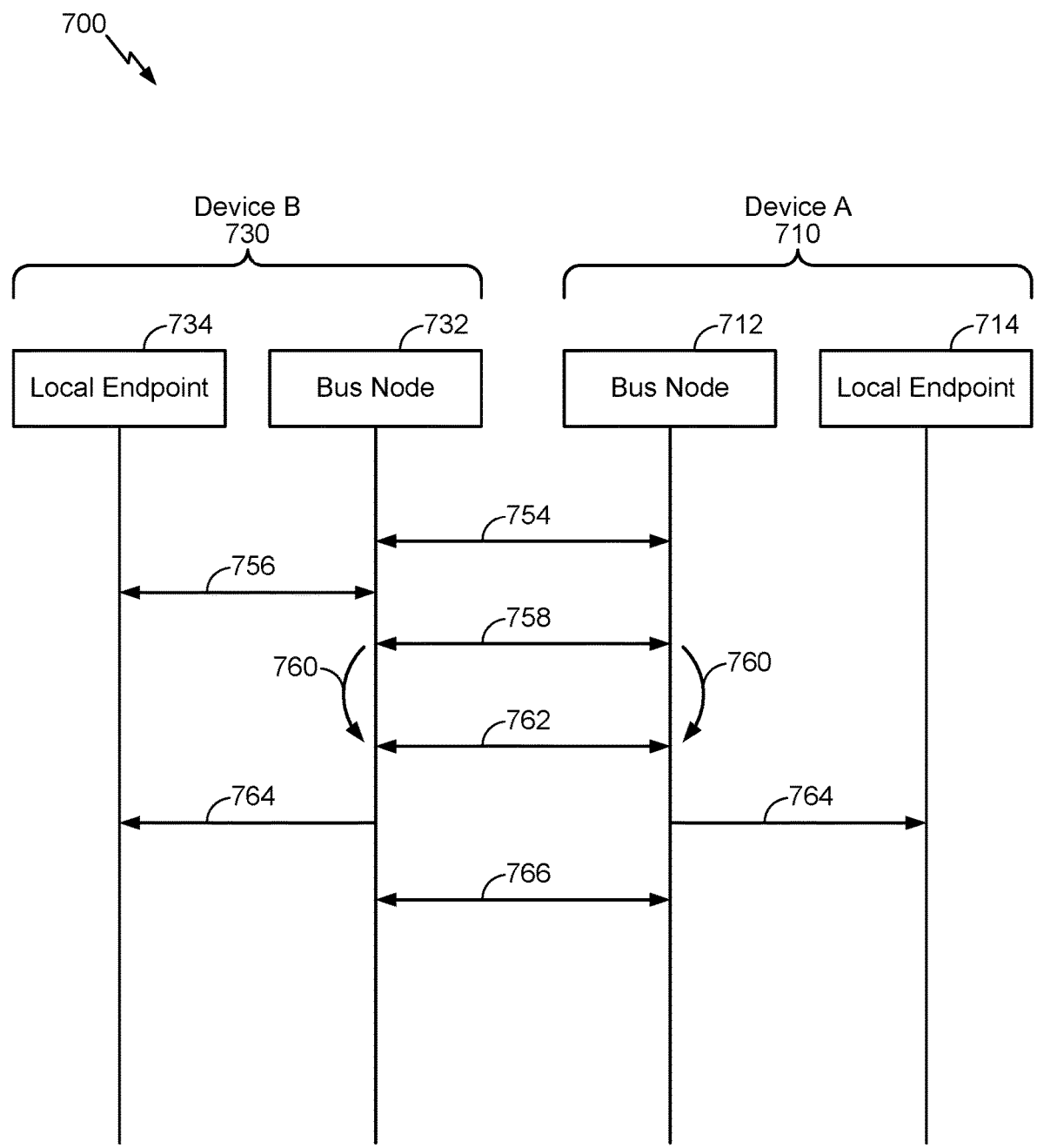
FIG. 7 illustrates an exemplary message sequence in which discoverable P2P services may be used to establish a proximity-based distributed bus over which various devices may communicate, according to one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc., available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

Figure 8:
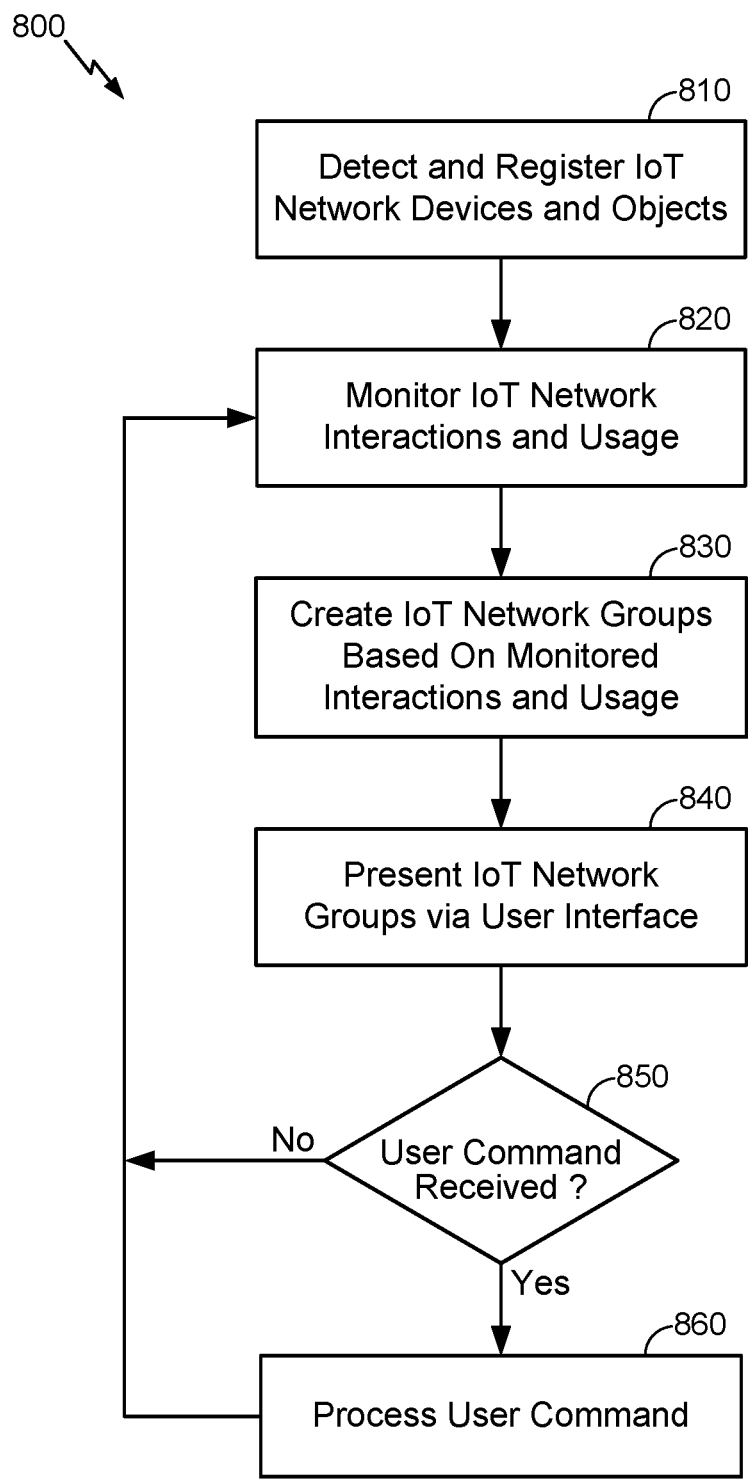
FIG. 8 illustrates an exemplary method for automatic and configurable sub-division in an IoT network that includes various IoT devices, according to various aspects of the disclosure.

According to various aspects of the disclosure, FIG. 8 illustrates an exemplary method 800 that may be used to automatically create configurable sub-divisions within an IoT network and thereby manage various heterogeneous IoT devices and other physical objects that may have different types, perform different activities (e.g., lights, printers, refrigerators, air conditioners, etc.), and have different interaction and usage patterns. In particular, due to the potentially large number of heterogeneous IoT devices and other physical objects that may be in use within a controlled IoT network, coordinating interactions and usage associated therewith to implement desired functions or otherwise control the IoT network to meet user demands and needs can be difficult. For example, a visitor to another person's house may desire to play a song on speakers located in the house. However, the visitor may be unable to copy the song (e.g., because the song has digital rights management embedded therein), Bluetooth pairing to another device may be difficult, or other conditions may interfere with the ability to easily play the song on the house speakers. Furthermore, due to the potentially large number of devices and other physical objects that may be in use within the controlled IoT network, a user that searches for available devices may be inundated with too many options to the point that search results may be practically useless. Accordingly, as described in further detail herein, the method 800 shown in FIG. 8 may be used to automatically organize or otherwise group various heterogeneous IoT devices and other physical objects (e.g., non-IoT devices that have communication capabilities and/or other physical objects that do not have communication capabilities), which may enable automatic and configurable control over the IoT network such that the heterogeneous IoT devices and other physical objects deployed therein can work together more efficiently, optimize communication and information sharing, and generally improve overall effectiveness and user experience.

More particularly, according to various aspects of the disclosure, the method 800 shown in FIG. 8 may initially include detecting and registering various devices and/or other physical objects into the IoT network at block 810, wherein a supervisor device associated with the IoT network may detect and register one or more IoT devices, one or more non-IoT devices, and/or other suitable physical objects that are coupled to otherwise used in the controlled IoT network at block 810. In one embodiment, the IoT devices detected and registered into the IoT network at block 810 may include any suitable electronic device having certain attributes and state information that can be embedded in, observed with, monitored with, controlled with, or otherwise managed with the supervisor device and connected to the IoT network (e.g., an appliance, sensor, refrigerator, toaster, oven, microwave, freezer, dishwasher, washer, dryer, furnace, air conditioner, thermostat, television, light fixture, vacuum cleaner, electricity meter, gas meter, cell phone, desktop computer, laptop computer, tablet computer, etc.). In one embodiment, the attributes associated with the IoT devices may be expressed using a universal vocabulary that provides a generic, adaptive, and extensible schema that can define any suitable facet that relates to interaction and usage associated with the IoT devices (e.g., schema values can evolve or otherwise adapt based on learning from environmental surroundings and discovery and interaction among IoT devices and new schema elements may be added to extend an existing IoT device vocabulary). For example, in one embodiment, the universal vocabulary may express attributes associated with a particular IoT device according to schema elements that may include, among other things, a globally unique identifier, make, model, type, and version attributes, supported inputs (e.g., voltage, amperage, gallons, BTUs, etc.), supported outputs (e.g., watts, temperature, area-units, volume-units, speed, etc.), supported capabilities (e.g., start, stop, shutdown, hibernate, standby, reset, introduce, etc.), and supported communication methods (e.g., Bluetooth, Wi-Fi, Infrared, Near-Field Communication, Shortwave Radio, etc.). Furthermore, the state information associated with the IoT device may indicate whether the IoT device is on or off, open or closed, idle or active, available for task execution or busy, or any other suitable information that may relate to the status associated with the IoT device.

Furthermore, in one embodiment, the non-IoT devices detected and registered into the IoT network at block 810 may include barcoded devices, Bluetooth devices, RF devices, RFID tagged devices, IR devices, or any other suitable device that can communicate over a short range interface (e.g., an air interface) and that the supervisor device can observe, monitor, control, or otherwise manage. Additionally, the other physical objects that may be detected and registered into the IoT network may include non-IoT devices that do not have communication capabilities. For example, the supervisor device or other IoT devices may have appropriate scanner or reader mechanisms that can detect shapes, sizes, colors, or other observable features associated with the non-communicating physical objects, which may then be registered into the IoT network. Moreover, certain IoT devices, communicating non-IoT devices, and/or non-communicating physical objects may be explicitly registered into the IoT network at block 810 in response to a user providing a command that adds the device and/or objects to the IoT network to the supervisor device or based on other automatic detection capabilities (e.g., in response to a user placing an online order to purchase a particular object and subsequently determining that the object has been delivered to the home). In this manner, any suitable physical object may become part of the IoT network in response to being detected and registered at block 810 (e.g., via the supervisor device).

In one embodiment, at block 820, the supervisor device may then monitor interactions and usage associated with the devices and/or other objects that were detected and registered at block 810, wherein the monitored interactions and usage may then be used to create one or more groups, sub-networks, subsets, or other suitable sub-divisions within the IoT network at block 830. For example, in one embodiment, each device or object registered at block 810 may include a globally unique identifier and each IoT device may further include a local database that stores information relating to each encounter or other interaction with another device or object in the IoT network (e.g., the globally unique identifier that corresponds to the other device or object associated with the interaction, a time stamp or other temporal context relating to the interaction, a function that the interaction performed or otherwise relates to, a location where the interaction occurred, or other suitable context relating to the interaction, such as whether the owner was present or away from the IoT network when the interaction occurred).

Accordingly, in one embodiment, the IoT devices may communicate information relating to each encounter or other interaction stored in the local database to the supervisor device, which may further maintain a local database that stores information relating to each encounter or other interaction in the IoT network to monitor the interaction and usage at block 820. Furthermore, in one embodiment, the supervisor device may observe or otherwise monitor other interactions and usage that occurs in the IoT network at block 820 to further populate the local database. For example, in one embodiment, the non-IoT devices may include a coffee cup that has an RFID tag or barcode, wherein a cabinet IoT device may have an appropriate scanner or reader that can read the RFID tag or barcode to detect when the coffee cup was placed in the cabinet or removed therefrom. In another example, a refrigerator IoT device may be equipped with a similar scanner or reader mechanism that can read RFID tags or barcodes on items added or removed from the refrigerator IoT device and/or detect shapes, sizes, colors, or other observable features associated with non-communicating physical objects added or removed therefrom to identify the non-communicating physical objects (e.g., the refrigerator IoT device may know that limes and lemons have a certain physical shape and size and distinguish whether an added or removed object that has that physical shape and size was a lime or lemon based on whether the object was green or yellow). In still another example, the refrigerator IoT device may reside in a kitchen, such that when a visitor to a home associated with the IoT network enters the kitchen and comes within a suitable proximity to the refrigerator IoT device, the refrigerator IoT device may record the encounter with the visitor and/or any other individuals present in the kitchen at that time.

In one embodiment, as noted above, the supervisor device may thereby create one or more groups, sub-networks, subsets, or other suitable sub-divisions within the IoT network at block 830 based on the interactions and usage monitored at block 820, wherein the interactions monitored at block 820 may generally occur among various IoT devices, an IoT device and a communicating non-IoT device, an IoT device and a non-communicating physical object, a communicating non-IoT device and a non-communicating physical object, multiple non-communicating physical objects, or any suitable combination thereof, while the usage monitored at block 820 may generally relate to one or more IoT devices, one or more communicating non-IoT devices, one or more non-communicating physical objects, or any suitable combination thereof. In particular, the IoT devices may communicate relevant information relating to any interactions that involve the IoT devices and any usage associated therewith to the supervisor device, which may then use the communicated information to populate the local database. However, because the communicating non-IoT devices and the non-communicating physical objects may not store all the information relevant to the interactions and usage associated therewith, the supervisor device may derive the relevant information based on other signals communicated within the IoT network (e.g., the supervisor device may derive information relating to the interactions and usage associated with the communicating non-IoT devices from globally unique identifiers that the communicating non-IoT devices send to the supervisor device, times when the unique identifiers were received, information that may indicate locations where the interactions or usage occurred, etc., and the supervisor device may similarly derive information relating to the interactions and usage associated with the non-communicating physical objects from any relevant information that the IoT devices and/or communicating non-IoT devices send to the supervisor device).

In one embodiment, to then create the one or more groups, sub-networks, subsets, or other suitable sub-divisions within the IoT network at block 830, the supervisor device may determine explicit, implicit, predefined, dynamic, or other suitable relationships among the various devices and objects registered into the IoT network based on the monitored interactions and usage recorded in the local database. More particularly, certain devices or objects may be pre-programmed to have an explicit relationship to another device or object (e.g., a refrigerator may have an explicit relationship with a person who owns the refrigerator and a location in the IoT network, such as a primary refrigerator being permanently located in a kitchen and a secondary refrigerator being permanently located in a garage). Furthermore, in response to the monitored interactions and usage indicating that a visitor entered the kitchen at the same time that the owner was present, an implicit relationship between the visitor and the owner may be automatically derived to add the visitor to a trusted friend group. For example, the supervisor device may organize people who access or otherwise come within proximity to the IoT network into a relationship hierarchy (e.g., Family, Friends, Acquaintances, etc.). As such, in response to the monitored interactions indicating a first meeting with a certain individual, the supervisor device may add the individual to the Acquaintance group at block 830. Furthermore, in response to subsequent monitored interactions indicating additional meetings with the individual within a certain time period, the supervisor device may upgrade the individual from the Acquaintance group to the Friend group at block 830. Further still, if the additional meetings occurred within the home associated with the IoT network or at certain hours (e.g., indicating that the owner and the other individual frequently spend time together in the evening), the supervisor device may upgrade the individual to the Family group at block 830.

Furthermore, in one embodiment, the various groups created at block 830 may similarly create sub-divisions associated with the physical devices and other objects registered in the IoT network. In particular, based on how the physical devices and other objects are used and interact within the IoT network, the physical devices and other objects may be sub-divided into Media Devices, Home Office Devices, and so on. For example, if the interactions and usage indicate that a camera was used to take pictures, a computer was used to download the pictures from the camera, a certain application was loaded on the computer to edit the pictures or share the pictures online, and that the pictures were shared with certain individuals, the groups created at block 830 may include a Pictures group with members that include the camera, the computer, the computer application, the individuals with whom the pictures were shared, and the downloaded pictures themselves. In another example, if the monitored interactions and usage indicate that lights in a room are always turned off or dimmed when a projector device is used, the groups created at block 830 may include a suitable sub-division with members that include the projector device, the lights, and the room where the projector was used and the lights dimmed or turned off.

Accordingly, the various groups created at block 830 may be dynamically formed using a machine-learning algorithm (e.g., that the supervisor device executes) based on actual usage and interactions that are observed or otherwise monitored in the IoT network. In this manner, the groups may be created at block 830 independently from any predefined semantic structures or language, instead structuring the groups in a dynamic and ad-hoc manner that learns context in a manner that reflects user preference and real-world activities.

Furthermore, in one embodiment, users may be provided with the ability to customize the group structures created at block 830 and thereby adjust the automatically learned context to better reflect user preference and real-world activities and improve how the supervisor device may learn context from subsequent interactions and usage. For example, in one embodiment, the various groups created at block 830 may be presented via a user interface (e.g., on supervisor device) at block 840, and the supervisor device may subsequently determine whether a user command was received at block 850. As such, in response to determining that a user command was not received at block 850, the supervisor device may iteratively monitor the interactions and usage in the IoT network (i.e., returning to block 820 and the subsequent blocks) and create or modify the groups, subsets, sub-networks, or other suitable sub-divisions within the IoT network on the assumption that the criteria used in the machine-learning algorithm accurately reflected the user preference and real-world activities previously used to create the groupings.

On the other hand, in response to determining that a user command was received at block 850, the supervisor device may then process the command at block 860. For example, in one embodiment, the command may be used to modify the groups that were created at block 830 and/or create new groups, in which case the supervisor device may appropriately modify the groups and/or create new groups based on the command at block 860. Furthermore, the command may be used to control access to certain portions within the IoT network (e.g., a sub-network that includes certain devices and/or other objects). For example, in one embodiment, the command may be used to provide full access permissions to anything in the IoT network to anyone in the Family group, provide people in certain group limited access to a portion of the IoT network (e.g., allow anyone in the Friends group to use a Wi-Fi sub-network within the overall IoT network, allow people in a Customer Service group to access the refrigerator to feed pets while the owner may be on vacation or access the utility room to service malfunctioning equipment, etc.), or otherwise provide fine-grained access control to the IoT network (e.g., controlling particular sub-networks that guests can access, controlling how devices and/or other objects in the IoT network can interact with one another or be used, etc.). Additionally, in response to suitably processing the command at block 860, the supervisor device may iteratively monitor the interactions and usage in the IoT network in a similar manner to when no command was received (i.e., returning to block 820 and the subsequent blocks), except that the supervisor device may refine the criteria used in the machine-learning algorithm to create or modify the groups, subsets, sub-networks, or other suitable sub-divisions within the IoT network to more accurately reflect user preferences and real-world activities that may be indicated in the command that was processed at block 860.

Although the foregoing description relating to the method 800 shown in FIG. 8 may appear to indicate that the supervisor device represents a device separate from the devices and/or other physical object in the controlled IoT network, those skilled in the art will appreciate that a particular IoT device in the controlled IoT network may be the supervisor device, that the supervisor device may be incorporated into a particular IoT device in the controlled IoT network, or that any other suitable configuration or arrangement may be used. For example, in one embodiment, the supervisor device can correspond to a computer or cell phone that performs a device control or management operation in addition to using local attributes to implement certain functions (e.g., a computer may be the supervisor device to coordinate a lighting effect for a projection screen while separately adjusting a contrast ratio of video being streamed to the projector for output in order to adapt to the coordinated lighting effect, etc.). Accordingly, the foregoing description indicates that certain signals or other messages are exchanged between the supervisor device and the devices and other objects that form the controlled IoT network, those skilled in the art will appreciate that certain signals or messages can be omitted to the extent that the supervisor device corresponds to a particular IoT device in the controlled IoT network.

Having provided the above background relating to certain mechanisms that may be used to create relevant sub-divisions within an IoT network based on monitored interactions and usage in the IoT network, the following description details various mechanisms that may use IoT technologies to discover relationships among devices (and by extension the users that own the devices) such that the discovered relationships can be leveraged to control interactions among the devices (e.g., allowing the visitor to quickly and easily play the song on the speakers in the house if the visitor and the homeowner have a known relationship). More particularly, as noted above, various IoT devices may be detected and registered with a server or other suitable supervisor device and associated with various attributes that may be expressed using a universal vocabulary. For example, the attributes may generally describe locations, interactions, usage, or other relevant state data associated with the IoT devices. Furthermore, each IoT device can be assigned a unique identifier and have a local database to store each interaction that the IoT device has with other IoT devices, including IoT devices that other users may own. Accordingly, the more times that a particular IoT device interacts with an IoT device associated with another user, a stronger relationship can be implied or otherwise inferred between the IoT devices and consequently the users that own the IoT devices. Furthermore, the strength and/or type associated with the relationship can be further implied or otherwise inferred according to types associated with the IoT devices that interact with another, the locations where the interactions occurred, the times that the interactions occurred, or other suitable factors.

In one embodiment, the relationships among the IoT devices and the users associated therewith may have an explicit, implicit, predefined, dynamic, or other suitable type, and the relationships may further be organized hierarchically (e.g., according to Acquaintances, Friends, Close Friends, Family, etc.). Alternatively (or additionally), the relationships could be numbered or assigned another suitable ranking (e.g., from one to five or one to ten, where one is the weakest relationship and five or ten is the strongest relationship). In one embodiment, the first that two IoT devices interact with one another, the relationship among the two IoT devices may be assigned the lowest ranking and the ranking associated with the relationship may be increased over time based on further interactions between the IoT devices. For example, at a first interaction between two different users, respective IoT devices that the users own may record the interaction and assign an Acquaintance relationship to the users. After additional interactions between the users, and perhaps within a certain time period or at certain locations, the IoT devices can upgrade the relationship between the users to Friends. If the interactions occur within a home and at a certain time (e.g., every evening), the relationship between the users can be further upgraded to Family, etc.

In one embodiment, the type and/or location associated with a particular IoT device can be leveraged to imply a relationship between two users. In this context, the location associated with an IoT device does not necessarily refer to a geographic position, but rather can refer to a room or other personal space in which the IoT device may be located, which can be inferred from the type associated with the device. For example, if a refrigerator IoT device detects an IoT device associated with a visitor, the visitor may be inferred to be located in the kitchen because a refrigerator will typically be located in a kitchen, whereby the visitor and the homeowner can be inferred to have a Friend relationship or higher because since first-time acquaintances typically do not enter a person's kitchen. In another example, if an IoT device knows that the user associated therewith is at work, any interactions with other IoT devices may not necessarily increase the rank with the other IoT devices even if the interactions occur frequently. Rather, the relationships may remain at the Acquaintance level. However, if the IoT device detects a work IoT device associated with another user at a non-work location (e.g., at another user's home), the relationship between the users can be increased because the location indicates that the users are interacting in a social context.

Furthermore, in one embodiment, the time that an IoT device associated with a first user interacts with an IoT device associated with another user can be leveraged to imply a relationship between the users. For example, if the IoT device associated with the first user detects a particular IoT device associated with the other user at a set time each month, the IoT device associated with the first user may determine that the other user is not very important user and therefore assign a low rank to the relationship. However, if the IoT device associated with the first user detects the IoT device associated with the other user every night, the IoT device associated with the first user may determine that this is an important user and therefore assign a higher rank to the relationship. To make the strongest, or most accurate, relationship determination, the IoT device can leverage any relevant determinable factors associated with the interaction (e.g., the frequency, location, and time associated with the interaction, the type associated with the IoT devices that interact with one another, etc.). Moreover, the relationship ranking can be suitably decreased based on the detected interactions between the IoT devices and/or the associated users. For example, if frequent interactions are detected between IoT devices associated with different users and the interactions subsequently stop for a significant time period, an inference may be made that the relationship between the users has ended. In another example, if the IoT device associated with a first user detects the IoT device associated with a particular visitor at the first user's house on a regular basis and then the regular visits cease, the relationship between the users may be decreased to a less important relationship.

In one embodiment, each level in the relationship hierarchy can be assigned an access level to one or more IoT devices and/or IoT device groups. For example, IoT devices associated with users having an Acquaintance relationship may be permitted low-level access, while IoT devices associated with users having a Family relationship may be permitted higher-level or full access (e.g., depending on parental controls or other factors). In another example, IoT devices associated with users having a Friend relationship may be permitted to access an entertainment system, a local wireless network, home appliances, or other suitable IoT devices and/or IoT device groups and prohibited from reprogramming or otherwise modifying the IoT devices to which access may be permitted. Further still, IoT devices associated with users having a Close Friends relationship may be permitted access to more IoT devices and/or IoT device groups and/or greater control over the IoT devices to which access is permitted, while IoT devices associated with users having a Family relationship may have access to and full control over all IoT devices.

Figure 9:
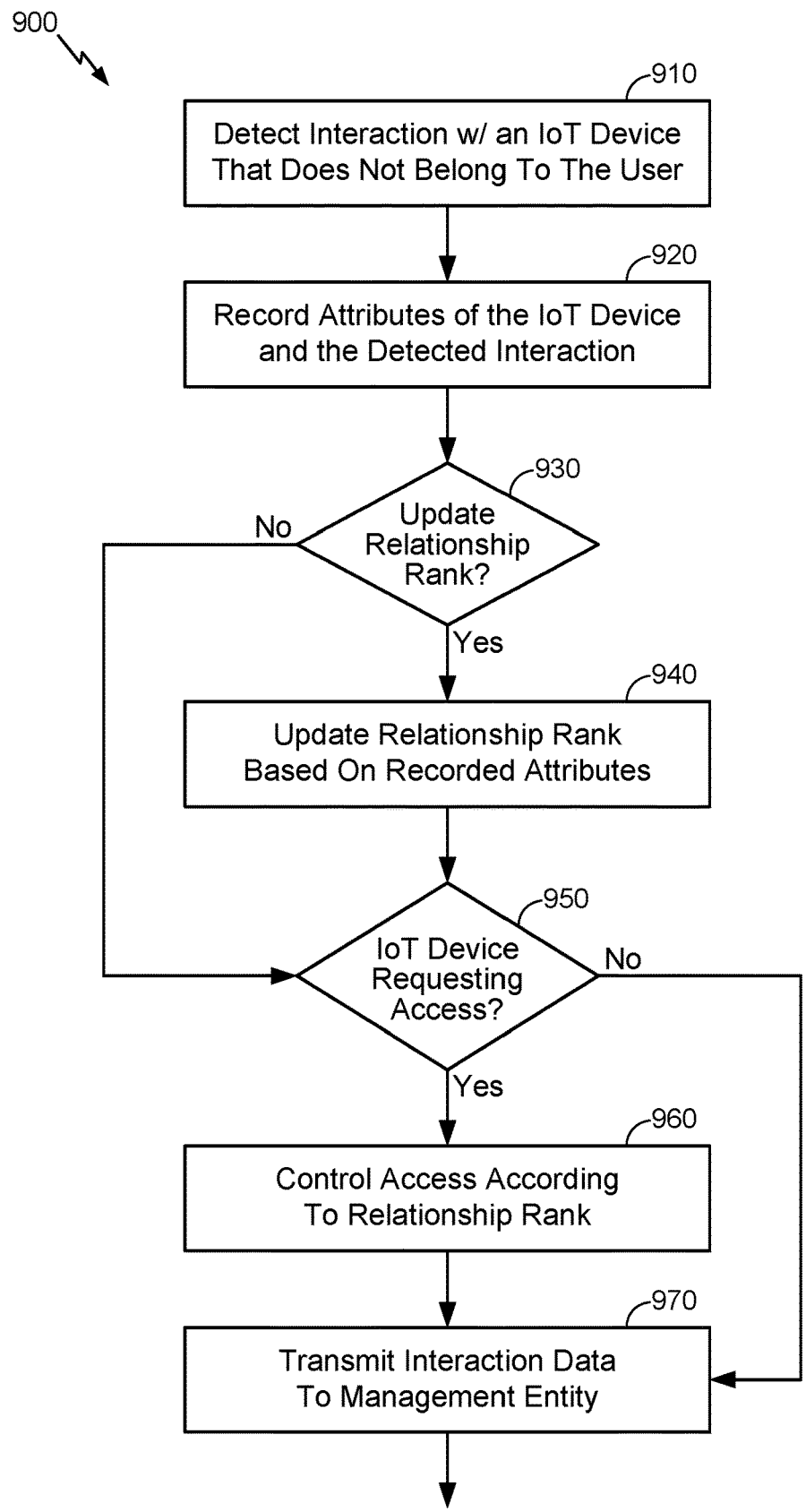
FIG. 9 illustrates an exemplary method that may implicitly create relationships among IoT devices, according to one aspect of the disclosure.

Referring now to FIG. 9, an exemplary method 900 to implicitly create relationships among IoT devices may involve IoT devices associated with various different users sending data that relates to interactions that the IoT devices detect and relationships that the IoT devices infer to a management entity (e.g., the supervisor device 130 shown in FIGS. 1B-1D, the IoT server 170 shown in FIGS. 1A-1B and 1D-1E, etc.). The management entity can then collate the interaction data received from the various IoT devices and use the collated interaction data to further infer relationships among the IoT devices and the users associated with the IoT devices. For example, if the management entity determines that a particular relationship should have a different rank based on the collated interaction data, the management entity can instruct the appropriate IoT devices to update the relationship rankings stored in the local databases associated therewith. Alternatively, in one embodiment, the IoT devices may only store data about the interactions with other IoT devices and transmit the interaction data to the management entity, which may then infer the relationships and notify the IoT devices about the inferred relationships such that the IoT devices can use the relationships that the management entity inferred to control the permitted access associated with the other IoT devices.

Accordingly, in one embodiment, the method 900 shown in FIG. 9 may be performed at a particular IoT device or the management entity may alternatively (or additionally) perform the method 900. Furthermore, the aspects described herein further apply to the management entity, in that the management entity may comprise an IoT device that can detect and interact with other IoT devices, assign or otherwise rank relationships associated with the other IoT devices, and determine the permitted access that the other IoT devices may have based on the relationships.

In one embodiment, at block 910, an IoT device associated with a first user may detect an interaction with an IoT device that belongs to another user and obtain sufficient information from the other IoT device to at least uniquely identify the other IoT device. As such, the IoT device may determine that the other IoT device does not belong to the same user in response to determining that the user identifier associated with the other IoT device differs from the user identifier associated with the IoT device that detected the interaction. Alternatively, the IoT device may store identifiers associated with each IoT device that the first user owns in a registry and determine that the other IoT device does not belong to the same user if the other IoT device does not have an identifier that appears in the registry.

In one embodiment, at block 920, the IoT device associated with the first user may record any determinable attributes associated with the other IoT device and the interaction with the other IoT device. For example, the recorded attributes can include, among other things, the identifier associated with the other IoT device, the type associated with the other IoT device, the time when the interaction occurred, the location or personal space where the interaction occurred (e.g., inside, outside, at the first user's workplace, at the first user's house, the room in the house, etc.). In addition, the attributes associated with the interaction may indicate whether the other IoT device has requested access to the IoT device or another IoT device associated with the first user, what the IoT device has requested access to, and the like. Furthermore, if the IoT device differs from the management entity, the IoT device can suitably transmit the attributes recorded at block 920 to the management device.

In one embodiment, at block 930, the IoT device may determine whether or not to update the relationship ranking associated with the other IoT device based on attributes associated with previously recorded interactions and/or the recorded attributes associated the current interaction. For example, if the current interaction increases the number or interaction frequency with the other IoT device above a threshold, the IoT device may increase the relationship ranking associated with the other IoT device at block 940. In another example, if the current interaction corresponds to the first interaction at the first user's home, the IoT device may likewise increase the relationship ranking associated with the other IoT device at block 940. In still another example, if the current interaction corresponds to the first interaction in a time period that exceeds a certain threshold, the IoT device may decrease the relationship ranking associated with the other IoT device at block 940. Accordingly, if the IoT device determines that the relationship ranking associated with the other IoT device should be updated at block 930, the IoT device may appropriately update the relationship ranking at block 940.

In one embodiment, at block 950, the IoT device may determine whether the other IoT device has requesting access to the IoT device or another IoT device associated with the first user (e.g., based on the attributes recorded at block 920 indicating that a message requesting access was received from the other IoT device). In response to determining that the other IoT device has requested access to the IoT device or another IoT device associated with the first user, the IoT device may control the access associated with the other IoT device at block 960 according to the ranking associated with the relationship assigned to the other IoT device (e.g., granting full access, granting limited access, denying access, etc.).

In one embodiment, at block 970, the IoT device may then optionally transmit data relating to the detected interaction to the management entity if the IoT device does not correspond to the management entity. For example, the interaction data transmitted to the management entity may include the recorded attributes associated with the other IoT device and the interaction, any updates or other changes to the relationship associated with the other IoT device, an indication relating to whether or not access was requested and/or the extent to which any access was granted or denied, and so on.

According to one aspect of the disclosure, because there are many IoT users that may each have potentially different personalities and behavior patterns, the following description details various mechanisms that may advantageously determine metrics that can be used to classify relationships that would apply to as many users as practicable. For example, aspects associated with user personalities and intensities of interactions may be taken into account when classifying relationships, wherein the relationships can be based on a percentage of the user's interactions rather than a specified number that is applied to all users across the board. In particular, each IoT device can be assigned a unique identifier and have a local database that stores information relating to each interaction that the IoT device has with other IoT devices. Alternatively, a centralized server, proxy, or other suitable entity may store the information relating to interactions between IoT devices. For example, in a home, a toaster may store all interactions between the residents of the home and a light switch.

In general, the more times that a particular IoT device associated with a first user interacts with one or more IoT devices associated with another user, am implied relationship between the users may be strengthened. Relationship ranks can also be weakened. For example, if the IoT device detects frequent meetings between two users then those meetings stop for a significant period of time, the IoT device may infer that the relationship between the users has ended. In another example, if the IoT device detects a particular visitor at the user's house on a regular basis and then those regular visits cease, the IoT device may determine that the relationship has changed to a less important relationship. However, not all cases where interactions between two IoT devices stop or become less frequent should result in a decreased relationship rank. Rather, historical interactions can cause future, less repetitious interactions to be more relevant. For example, two users may be neighbors and good friends, but one neighbor may move away, causing a decrease in the number of interactions between the users (and likely a change in the type of interactions). At some future time, one of the users may move close to the other user again. In such a scenario, it's likely that the users will seek each other out and re-establish or continue their previous close relationship. As such, this relationship should be given a higher rank again if it was previously decreased. In any case, the strength and/or type of the relationship can also be based on the type and/or location of the IoT devices and/or the time of the interaction. Based on these factors, the IoT device can determine the implied relationship between the users. In one embodiment, the interactions between IoT devices can be proximity detections, text messages, multimedia messages, phone calls, emails, etc. A proximity detection may include a proximity check, such as a Listen Location (LILO) proximity check, a Bluetooth pairing, communication over the same local wireless network, or any other interaction between two UEs that indicates that they are proximate to each other. Alternatively, or additionally, a server may determine that two or more IoT devices are proximate each other based on locations of IoT devices stored at the server. For example, the IoT devices can periodically (e.g., every few minutes, several times an hour, etc.) transmit their locations to the server, which can compare the received locations to determine which IoT devices are within a threshold distance of each other. The threshold may be a few meters, or some other threshold that indicates that the IoT devices likely belong to users that are interacting with each other.

In one embodiment, the IoT device interactions can be stored in one or more interaction tables at an IoT device and uploaded to the server periodically (e.g., every few hours, once per day, etc.) or on request. Alternatively, the interactions could be uploaded to the server as they occur in real time and added to interaction tables on the server. In this case, there need not be an interaction table on the IoT device. Each user may decide how they wish their user interaction table to be stored. For example, some users may wish to store it on their IoT device and have the server request it, or only the necessary entries, as needed, while other users may wish to simply upload their interactions to a remote interaction table stored on the server. Interaction tables can be organized by identifiers of the IoT devices to which they correspond. An interaction table can store an identifier of the user, an identifier of the user's IoT device, an identifier of the other user, an identifier of the other user's IoT device, the type of interaction (e.g., proximity, email, text message, phone call, etc.), the location of the interaction, if applicable, and the time and/or length of the interaction (e.g., the time the interaction began/ended). One user may be associated with a number of IoT devices. An interaction table may store all interactions for each IoT device that occur over the life of the IoT device (i.e., the time during which the IoT device is in use by the same user) or only a certain number of interactions, such as the interactions over the last year or the last 1000 interactions.

Figure 10:
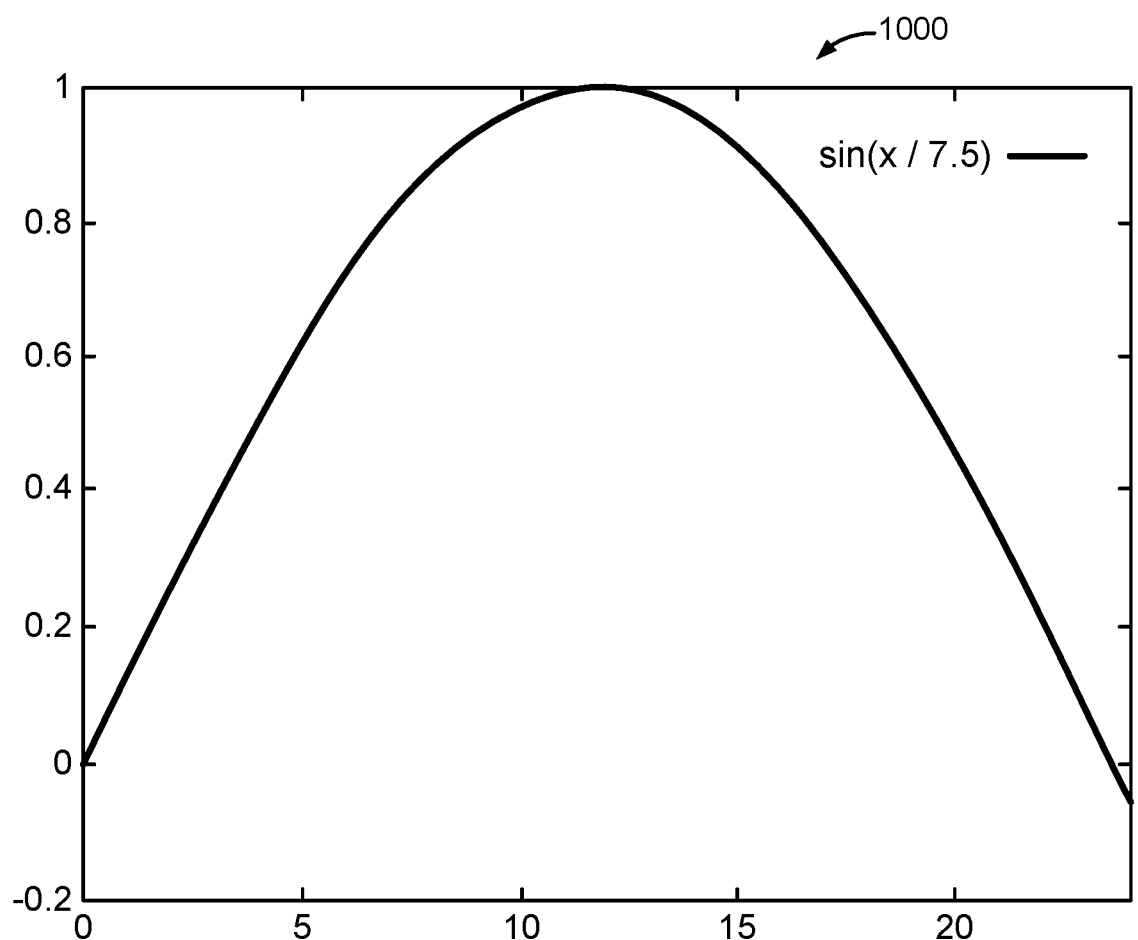
FIG. 10 illustrates a graph of an exemplary sin function that may be used in a context that relates to creating relationships among IoT devices, according to various aspects of the disclosure.

In one embodiment, an appropriate time period for analyzing the data in the interaction table may be determined. For example, if using a cyclic period, the IoT device or the server could analyze the interactions over a 24-hour period, a one-month period, a one-year period, etc. Also, if using a cyclic period, such as 24 hours, the IoT device or server must ensure that hour 23 transitions to hour 0. All of the possible time configurations can be used to search for patterns of location. For example, assume that a user is at the mall every Sunday from 11:00 AM to 3:00 PM or at his/her office every weekday from 9:00 AM to 5:00 PM. As a first solution, the IoT device or server can build a transitions table and use transition distances in the transitions table to compare data inputs to each other using cluster analysis based on the transition distances in the transitions table (e.g., according to the techniques described in U.S. Provisional Patent Application Ser. No. 61/901,822, entitled "NORMALIZING LOCATION IDENTIFIERS FOR PROCESSING IN MACHINE LEARNING ALGORITHMS," filed Nov. 8, 2013, assigned to the assignee hereof, and which is hereby expressly incorporated by reference in its entirety). In another solution, the IoT device or server can use a sin function to create cyclic relationships of time, wherein each sin function may be rebuilt based on the current 24-hour clock time. For example, the function $y=\sin(x/7.5+j/12)$ may create a cyclic relationship reflecting a 24-hour clock, where x=one input time, j=a second input time, and y=the distance between the two times. FIG. 10 illustrates a graph 1000 of the function $y=\sin(x/7.5+j/12)$.

In one embodiment, using the stored interaction table, an IoT device can assign a relationship value to each other user listed in its interaction table. Alternatively, if the server stores the interaction tables, the server can assign the relationship values. As such, rather than simply assigning a relationship based on the number of interactions between users, the various aspects of the disclosure can take into account aspects of the user's personality and intensity of interactions when classifying relationships. For example, the relationships can be based on a percentage of the user's interactions, rather than a specified number that is applied to all users across the board. That is, a relationship of Family may be assigned when a threshold percentage of the user's interactions are with the same other user, when a threshold percentage of the interactions occur at a certain location (e.g., in the user's home), when a threshold percentage of the interactions are of a given type (e.g., proximity detections), when a threshold percentage of the interactions occur at a certain time (e.g., in the evening or away from work), etc. Furthermore, a hierarchy of relationships can be assigned to IoT device users (e.g., Acquaintance, Co-Worker, Golf Buddy, Friend, Close Friend, Family, etc.). Alternatively, the relationships could be numbered from one to five or one to ten, where one is the weakest and five or ten is the strongest, for example. At the first meeting between two IoT devices, the relationship may be assigned the lowest ranking. Over time, the IoT device or the server may increase the implied relationship based on further interactions between the IoT devices.

In one embodiment, proximity interactions, the location(s) at which they occur, the frequency with which they occur, the time at which they occur, and possibly their length, are particularly relevant in determining relationships. To make the strongest, or most accurate, relationship determination, an IoT device can leverage all of the determinable factors of the interaction. For example, users that are frequently together (i.e., proximate each other) at particular locations are likely friends or family (e.g., two users that frequently go shopping together may be considered Close Friends). An IoT device or the server may determine that the two users are shopping together by detecting that they are within a threshold proximity to each other a threshold period of time while at a shopping center. The IoT device may initially assign a relationship of Friends to the users, then upgrade it to Close Friends after a threshold number of shopping trips or other such interactions (e.g., going to restaurants, night clubs, social events, etc.).

In one embodiment, the time that a user's IoT device interacts with another IoT device can be leveraged to imply the relationship between the users. For example, if the user's IoT device detects a particular IoT device at a set time every month, the IoT device may determine that this is not a very important relationship and assign a low rank to the relationship. However, if the IoT device detects the other IoT device every night, the IoT device may determine that this is an important relationship and assign a higher rank to the relationship. For example, if two or more users frequently gather together in the same room at approximately the same time every night for approximately the same amount of time (greater than some threshold), they are likely eating dinner together and can be considered to be Family. Similarly, if another user occasionally joins this group of users at this time, that user is likely a Close Friend or Family member, and his or her relationship status can be upgraded accordingly. On the other hand, users that are frequently together at other types of locations, even for relatively long periods of time, may not be friends or family. For example, if a user's IoT device knows that the user is at work, then any meetings with other IoT devices, even if occurring frequently, may not necessarily increase the rank assigned to the relationships. Rather, the relationships may remain at the Acquaintance level. However, if the user's IoT device detects a work IoT device at a non-work location, then the relationship between the users can be increased. For example, if a work IoT device is detected in the user's home, then the relationship between the users can be increased to Friend.

In one embodiment, the type and/or location of two IoT devices can also be leveraged to imply the relationship between their two users. The location of an IoT device does not necessarily refer to its geographic position, but can refer to the type of room in which it is located. This can be inferred from, for example, the type of device. For example, a refrigerator is typically located in a kitchen. Thus, if a refrigerator IoT device detects a different user's (e.g., a visitor) IoT device, meaning the visitor is in the kitchen, the refrigerator IoT device can imply that the visitor has a relationship with the homeowner of Friend or higher, since Acquaintances don't typically enter a person's kitchen. Accordingly, as IoT devices interact on a day to day basis, relationship groupings may be derived based on the devices' context awareness, where the context is defined by the group, and the group is defined by implicit relationships. In some cases, more than one relationship could be assigned to the same user, for example, Friend and Golf Buddy. By identifying and subsequently isolating these groups in time and space, the system can become more valuable to the user. Thus, a user and his or her corresponding interactions are not necessarily defined in isolation. Rather, each user can be defined in their context. For example, a person can be two users, user A, a father, and user B, a husband. When the person is acting in the context of user A as a father, his interactions may be interpreted differently than when the person is acting in the context of user B as a husband.

Figure 11A:
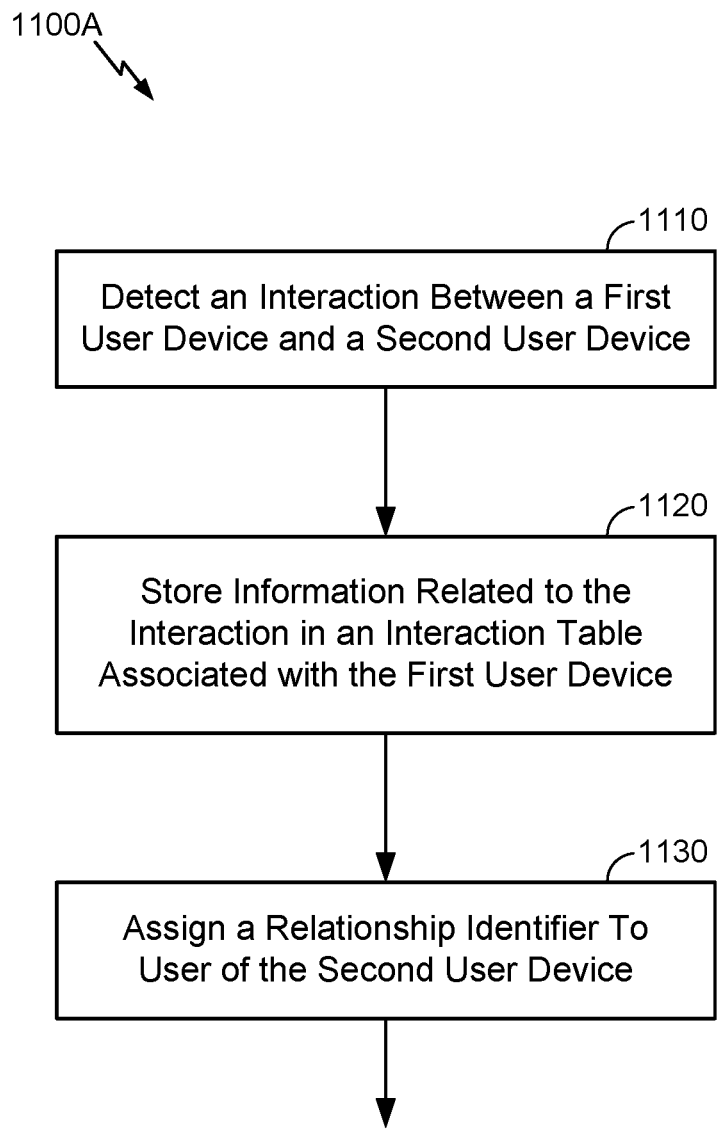
FIG. 11A illustrates an exemplary method that may implicitly create relationships among IoT devices, according to various aspects of the disclosure.

According to various aspects of the disclosure, FIG. 11A illustrates an exemplary method 1100A that may implicitly create relationships among IoT devices. The method 1100A illustrated in FIG. 11A may be performed by an IoT device, such as IoT device 110, 112, 114, 116, 118, 120, 200, or 300. Alternatively, the method 1100A illustrated in FIG. 11A may be performed by a supervisor device, such as supervisor device 130, or a server, such as IoT server 170. The aspects described herein are also applicable to a supervisor device in that a supervisor device can detect and interact with a visitor IoT device, assign it a relationship rank, and grant it access based on the relationship rank.

In one embodiment, at block 1110, an interaction between a first user device and a second user device is detected. The first user device may be the IoT device performing the method 1100A shown in FIG. 11. The detecting may include detecting that the first user device is proximate the second user device. The first user device may detect that it is proximate the second user device, or, if the method 1100A is being performed by a server, the server may detect that the first user device is proximate the second user device based on location information received from the first user device and the second user device.

In one embodiment, at block 1120, information related to the interaction is stored in a first interaction table associated with the first user device. The interaction table may be stored on the first user device or, if a server is performing the method 1100A shown in FIG. 11A, on the server. The information may include one or more of a type of interaction, a location of the interaction, a time of the interaction, a duration of the interaction, a frequency of the interaction, an identifier of the first user device, an identifier of a user of the first user device, an identifier of the second user device, or an identifier of the user of the second user device. The interaction type may include one of a proximity detection, a short messaging service (SMS) message, a multimedia messaging service (MMS) message, a phone call, or an email.

In one embodiment, at block 1130, a relationship identifier is assigned to a user of the second user device based, at least in part, on the information related to the interaction. The relationship identifier may be added to an entry in the first interaction table for the user of the second user device. The assigning that occurs at block 1130 may include assigning the relationship identifier to the user of the second user device based on a plurality of interactions with one or more user devices belonging to the user of the second user device. The information about the plurality of interactions may be stored in the first interaction table. The plurality of interactions may include a plurality of interactions occurring within a threshold period of time, occurring at a same time, occurring at a same location, having a threshold duration, having a threshold frequency, and/or having a same interaction type. Additionally, in one embodiment, the assigning that occurs at block 1130 may include updating the relationship identifier of the user of the second user device.

Figure 11B:
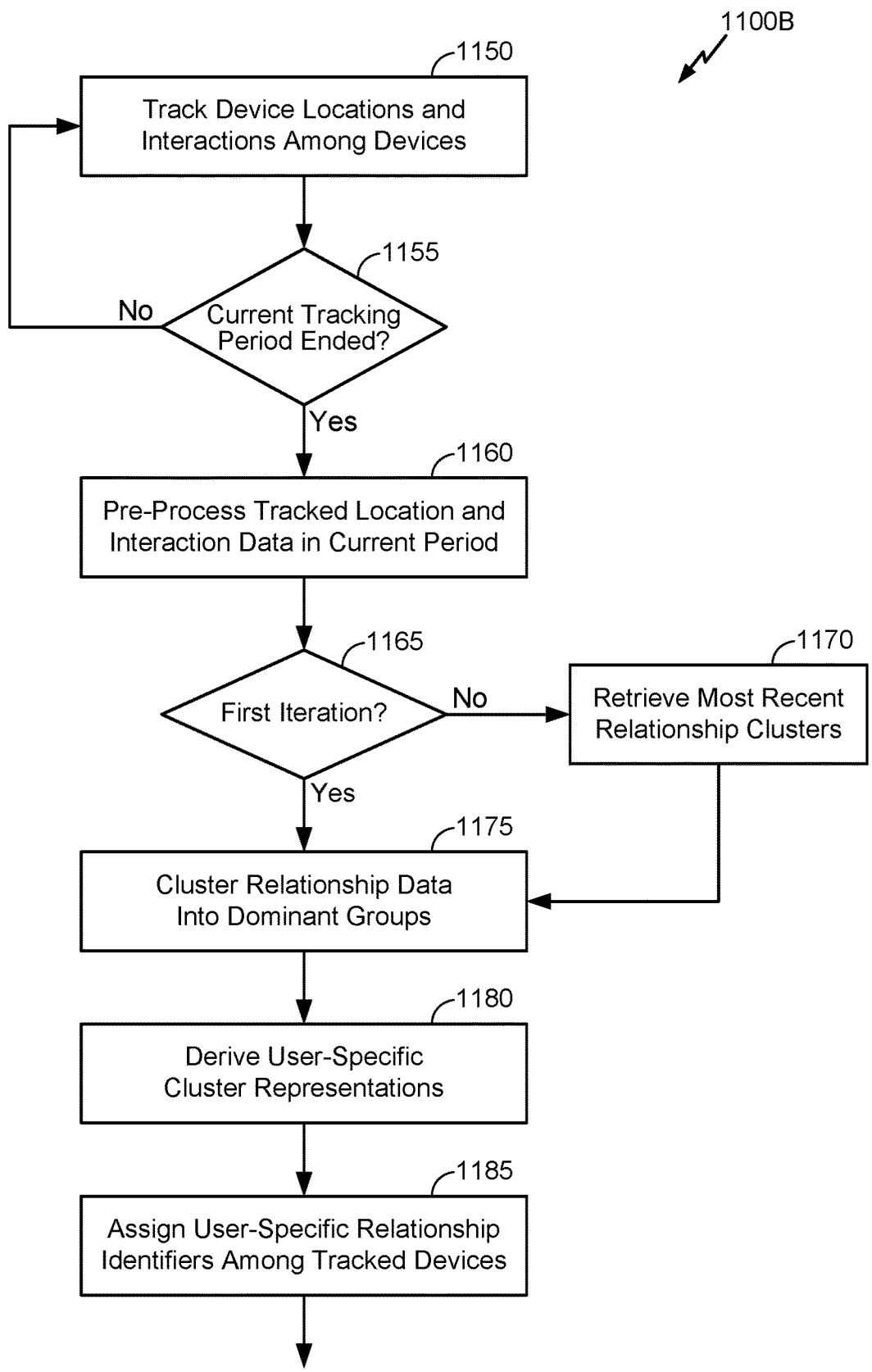
FIG. 11B illustrates an exemplary method that may track locations and interactions associated with various IoT devices to discover potentially asymmetric user-specific relationships, according to various aspects of the disclosure.

According to another aspect of the disclosure, FIG. 11B illustrates an exemplary method 1100B that may be used to track locations and interactions associated with various IoT devices and discover user-specific and potentially asymmetric relationships among the IoT devices. In particular, the method 1100A shown in FIG. 11A and described in further detail above may implicitly create relationships among IoT devices based on interactions therebetween, but relationships are typically complex and co-incidence occurrences (e.g., in certain locations, at certain times, etc.) may not always indicate the actual relationship between different users. For example, two people may frequently interact with one another but still not be friends. Additionally, some relationships may be asymmetric, where a first person (David) may consider another person (John) a good friend but John considers David a mere acquaintance. Accordingly, as will be described in further detail herein, the method 1100B shown in FIG. 11B may be used to deduce asymmetry in the relationships among different users based on locations, interactions, usage, and other relevant state data associated with various IoT devices, which may prove useful in determining or otherwise controlling how different IoT devices interact with one another. For example, in the case given above, tracked location, interaction, usage, and other relevant state data may actually indicate that David does not like John very much and that knowledge may be leveraged to control subsequent interactions between IoT devices that David and John own. Additionally, tracking the user who owns the location where a particular interaction occurs may be used to derive further relationship information. For example, if John often frequents David's clustered space but David rarely appears in John's clustered space, that asymmetry may be used to learn further information about the relationship between David and John.

More particularly, at block 1150, various registered IoT devices may send data relating to locations and interactions associated therewith to a server, which may track the locations associated with the IoT devices and the interactions among the IoT devices and compare the location and interaction data received from each IoT device to the location and interaction data received from other IoT devices to determine user-specific relationships. In one embodiment, the location and interaction data tracked and stored at the server may be processed at certain intervals (e.g., on a daily basis) to identify certain similarities (e.g., in usage patterns, location co-incidence, etc.). As such, the server may determine whether the current tracking period has ended at block 1155 and subsequently process the tracked location and interaction data in response to determining that the current tracking period has ended. Otherwise, the server may continue to receive location and interaction data from the registered IoT devices at block 1150 until the current tracking period ends.

In one embodiment, in response to determining that the current tracking period has ended, the server may pre-process the location and interaction data that has been received in the most recent tracking period at block 1160 in order to identify similar patterns or location overlaps among various IoT devices. In particular, the server may generally process the tracked location and interaction data on a daily basis or according to another periodic interval based on the new location and interaction data that was received in the most recent tracking period. As such, the location and interaction data tracked in any particular tracking period may build upon the location and interaction data that was tracked in previous tracking periods in an incremental manner.

In one embodiment, the pre-processing that occurs at block 1160 may include storing all location and interaction data that was reported from each IoT device in the most recent tracking period and (if applicable) all location and interaction data that has been previously processed in a directory associated with each particular IoT device. In one embodiment, the location and interaction data from a particular tracking period may then be retrieved and filtered to remove any data that does not have the proper format. The pre-processing that occurs at block 1160 may further include building a transitions table associated with each IoT device to define any relevant state changes (e.g., changed relationship between two IoT devices). Furthermore, at block 1160, the server may store the location and interaction data associated with all tracked IoT devices in a common directory or other suitable repository and create a device list that identifies each tracked IoT device. The pre-processed location and interaction data from the current tracking period may then be stored with the other previously processed location and interaction data associated with each IoT device.

In one embodiment, in response to pre-processing the location and interaction data from the current tracking period, the server may determine whether the location and interaction data was previously analyzed to determine relationships at block 1165. If so, the most recently determined relationship clusters may be retrieved at block 1170 and used to update or otherwise determine the relationships in the current iteration. Otherwise, if the location and interaction data was not previously analyzed (i.e., the current iteration is the first iteration), block 1170 may be skipped because there may not be any previously determined relationship clusters to retrieve. Furthermore, to avoid acting upon stale data and place greater importance on more recent locations and more recent interactions, the relationship clusters retrieved at block 1170 may be limited to relationship clusters that were determined within a particular time period (e.g., within the last month).

In one embodiment, at block 1175, the server may then set any relevant configuration parameters and use the pre-processed location and interaction data from the current tracking period (and/or any previously determined relationship clusters that may have been retrieved at block 1170) to cluster the location and interaction data into dominant groups according to suitable statistical techniques. The relationship data that was clustered into the dominant groups may then be analyzed to derive user-specific cluster representations at block 1180, wherein the user-specific cluster representations may then be used to assign user-specific relationship identifiers among the tracked IoT devices (and the users associated therewith) at block 1185. For example, in one embodiment, the location associated with each input may be plotted on a derived x-axis and y-axis and the user-specific cluster representations derived at block 1180 may be plotted using a suitable graphing utility (e.g., gnu-plot) that can be viewed and analyzed to help learn and classify the relationships among the tracked IoT devices and the users associated therewith, including any asymmetry therebetween.

Figure 12A:
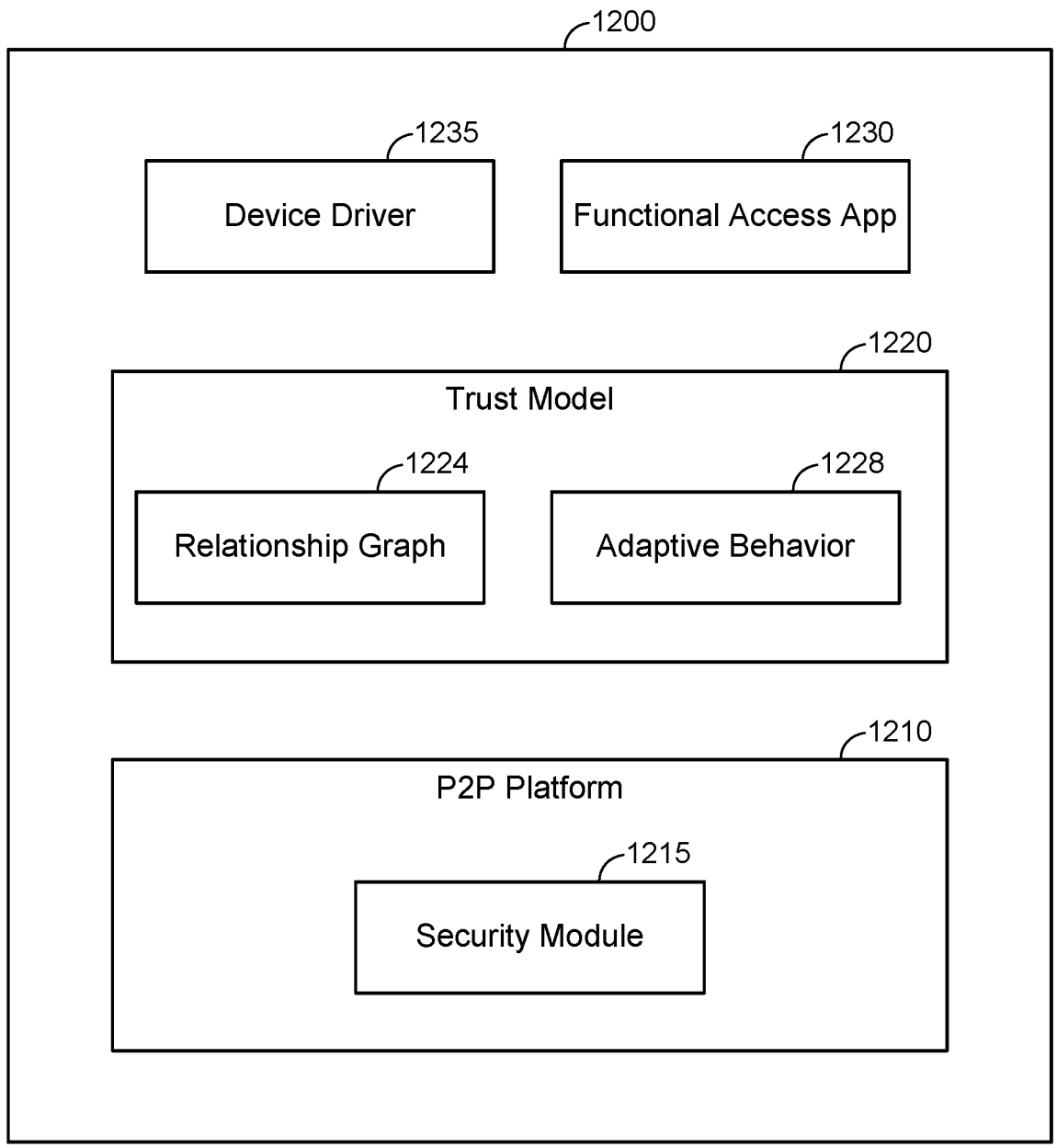
Figure 12B:
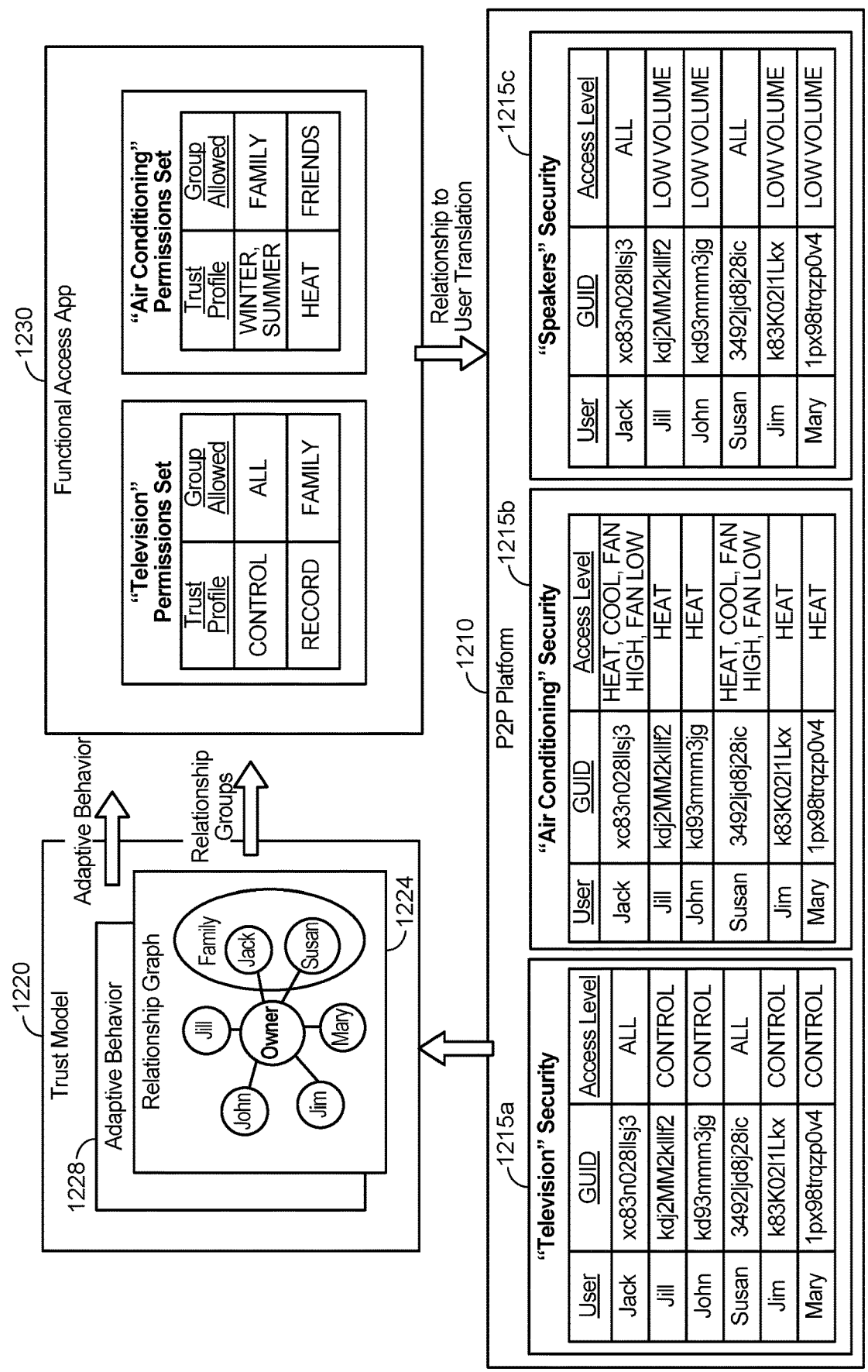
FIG. 12B illustrates exemplary interactions among the components in the architecture shown in FIG. 12A, according to various aspects of the disclosure.

According to various aspects of the disclosure, FIG. 12A illustrates an exemplary architecture 1200 that may be used to discover, configure, and leverage relationships in IoT networks, while FIG. 12B illustrates exemplary interactions among the components in the architecture 1200 shown in FIG. 12A. In particular, the architecture 1200 shown in FIG.

12A may generally be implemented in a suitable IoT device and include, among other things, a peer-to-peer (P2P) platform 1210 that may support proximity-based P2P communication and include a security module 1215 that can discover, configure, and leverage relationships in IoT networks, a trust model 1220 that may include a relationship graph 1224 that may represent the relationships that can be leveraged in IoT networks in addition to an adaptive behavior module 1228 that may define what actions or other behaviors certain users represented in the relationship graph 1224 are permitted to perform, a functional access application 1230 that may be used to control permissions assigned to certain users or certain user groups represented in the relationship graph 1224 and thereby share information or access to devices based on a trust level derived from the relationship graph 1224, and a device driver 1235 that may support certain core operations according to mechanisms (e.g., a device driver 1235 that an original equipment manufacturer (OEM) may supply).

In one embodiment, as noted above, the trust model 1220 may generally include the relationship graph 1224 to define one or more users or user groups that may have a certain trust level and to further define relationships among the one or more users or user groups. Furthermore, the adaptive behavior model 1228 may define "what" the users or user groups defined in the relationship graph 1224 are trusted with, whereby the trust model 1220 may automatically identify relationships among users (or people) and behavior patterns that relate to interactions with controllee devices. For example, referring to FIG. 12B, the relationship graph 1224 associated with an "owner" user may include various nodes to represent users or user groups that have a certain trust level, wherein the relationship graph 1224 shown in FIG. 12B includes nodes to represent users named "Jill," "John," "Jim," "Mary," "Jack," and "Susan." In that context, based on interaction patterns that occur over time, "Jack" and "Susan" may be considered family members and therefore included in a "Family" group, wherein the functional access application 1230 includes permission sets that define access that different users may have to a television and an air conditioning unit. For example, the television permissions set may associate all users with a trust profile that grants permission to control the television, while only family members may be associated with a trust profile that grants permission to record programs using the television. In a similar respect, the air conditioning permissions set may associate users in the family group with a Winter and Summer trust profile that grants permission to set the air conditioning unit to heat or cool and to set the fan on the air conditioning to high and low, while users in a friends group may only be associated with a Heat trust profile that grants permission to set the air conditioning to heat without granting any permission to set the fan speed. As such, the permission sets defined using the functional access application 1230 may be mapped to respective security settings 1215A-C that translate users to different access levels according to the relationships defined in the trust model 1220 and globally unique identifiers (GUIDs) that are associated with the respective users.

Figure 13A:
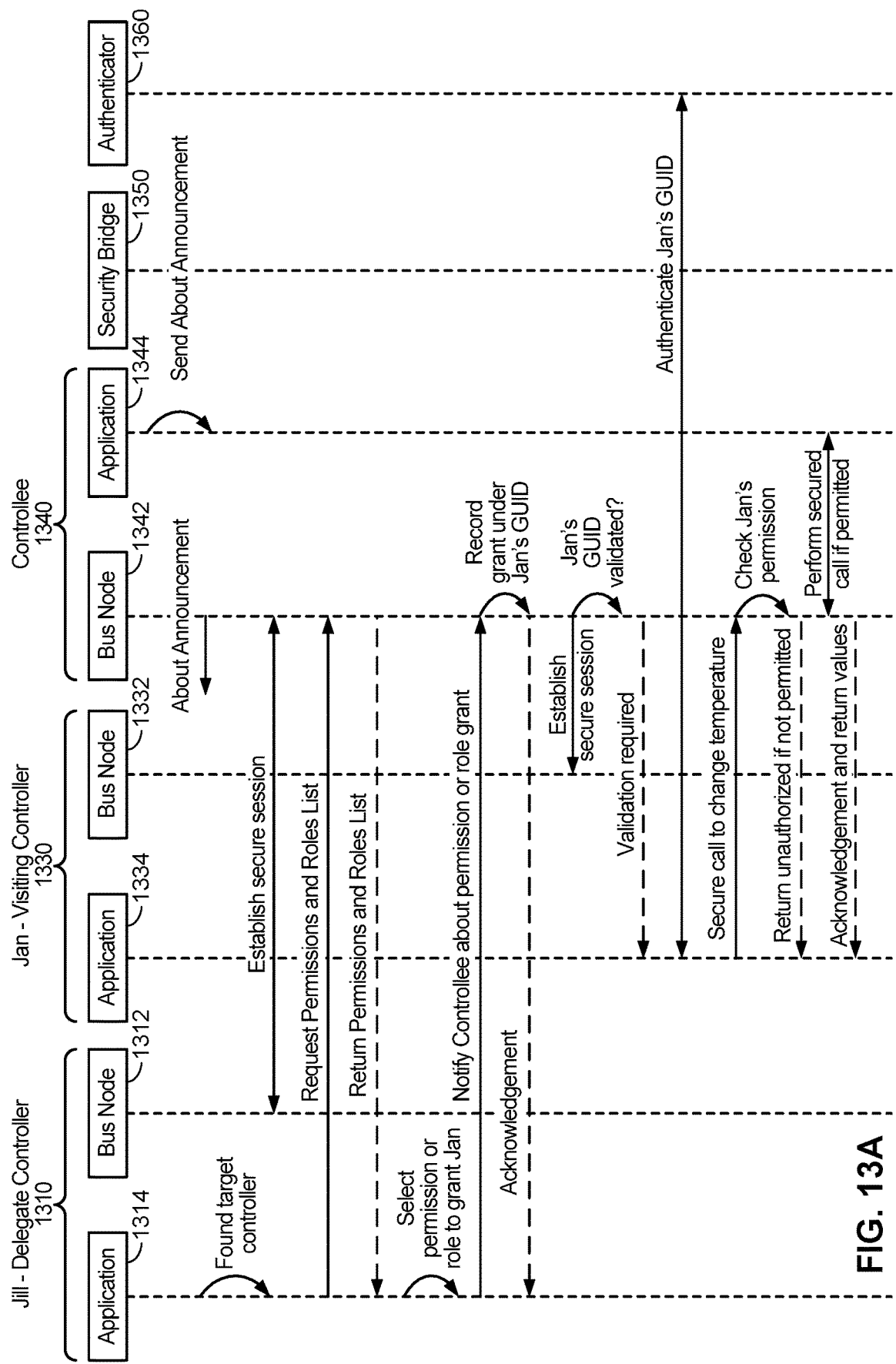
FIGS. 13A-13C illustrate exemplary interactions that may leverage relationships in an IoT network, according to various aspects of the disclosure.
Figure 13B:
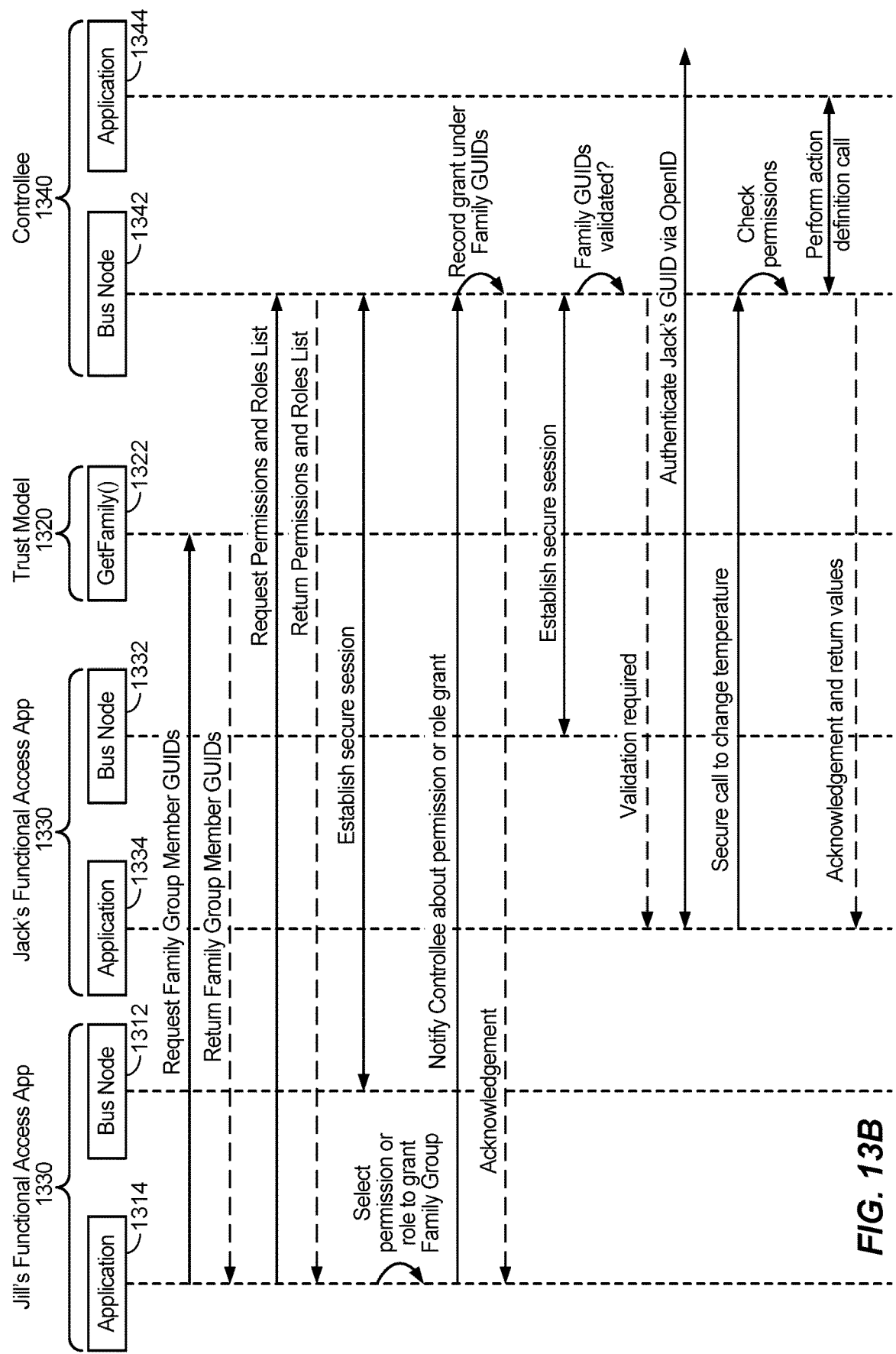
Figure 13C:
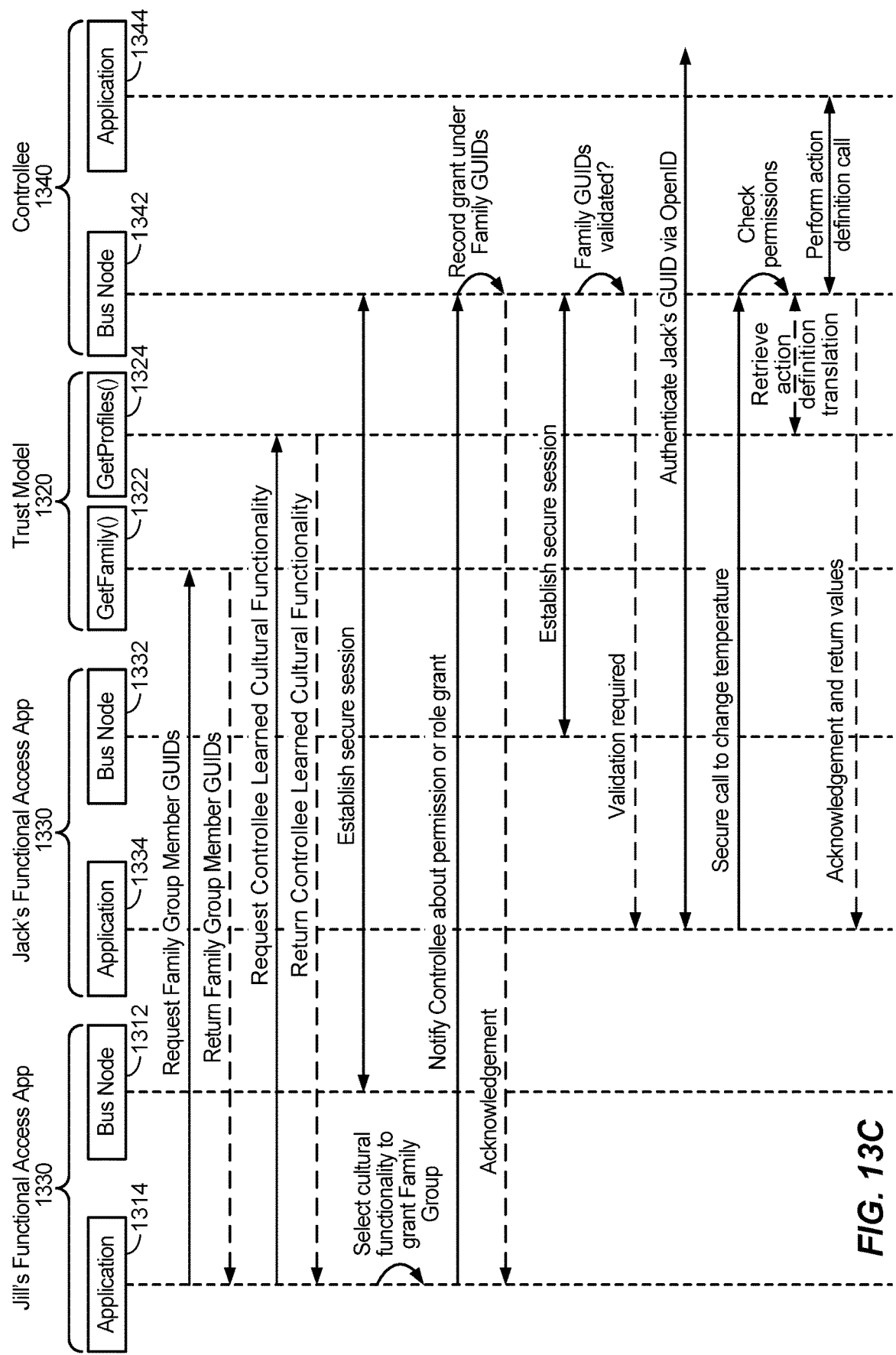

According to various aspects of the disclosure, FIGS. 13A-13C illustrate exemplary interactions that may leverage relationships in an IoT network (e.g., using the architecture 1200 shown in FIG. 12A and the exemplary interactions among the components in the architecture 1200, as shown in FIG. 12B). In particular, the interactions shown in FIG. 13A may generally leverage relationships in an IoT network independently from the trust model 1220 shown in FIG. 12A, while the interactions shown in FIGS. 13B and 13C may leverage the relationships using the trust model 1220.

For example, referring to FIG. 13A, suppose that Jill owns a delegate controller device 1310 and further owns a controllee device 1340, while Jan owns a visiting controller device 1330. In one embodiment, a security bridge 1350 may broadcast an about announcement associated with the controllee device 1340, which may include an application 1344 (e.g., corresponding to a local endpoint as shown in FIGS. 6-7) that detects the about announcement and causes a local bus node 1342 (e.g., corresponding to a local bus node as shown in FIGS. 6-7) to broadcast the about announcement. As such, an application 1314 on Jill's delegate controller device 1310 may detect the about announcement in a similar manner such that Jill's delegate controller device 1310 may find the target controller and a secure session may be established between the local bus node 1312 on Jill's delegate controller device 1310 and the local bus node 1342 on the controllee device 1340 (e.g., between respective GUIDs associated therewith). If Jill decides to grant Jan access to the controllee device 1340, the application 1314 on Jill's delegate controller device 1310 may then request a permissions and roles list from the controllee device 1340, which may then return the permissions and roles list to the application 1314 on Jill's delegate controller device 1310. The application 1314 on Jill's delegate controller device 1310 may then prompt Jill to select a permission or role to grant to Jan and notify the controllee device 1340 about the permission or role that Jill granted to Jan. The controllee device 1340 may then record the grant under a GUID associated with Jan and return an acknowledgement to the application 1314 on Jill's delegate controller device 1310.

In one embodiment, a secure session may then be established between the local bus node 1332 on Jan's visiting controller device 1330 and the local bus node 1342 on the controllee device 1340 (e.g., between respective GUIDs associated therewith), wherein Jan may attempt to access the controllee device 1340 via the secure connection. As such, the controllee device 1340 may determine whether Jan's GUID has been validated and may send a message to the application 1334 on Jan's visiting controller device 1330 via the local bus node 1342 in the event that Jan's GUID has not been previously validated. In response to the message requiring validation of Jan's GUID, one or more authentication steps may be performed between the application 1334 on Jan's visiting controller device 1330 and an authentication entity 1360 (e.g., an OpenID provider). Accordingly, Jan's GUID may be authenticated and Jan may then use the application 1334 on her visiting controller device 1330 to initiate a secure call to change the temperature (e.g., where the controllee device 1340 corresponds to a thermostat, air conditioning unit, or other temperature control device). The controllee device 1340 may then check whether Jan has permission to change the temperature and return an unauthorized status to the application 1334 on Jan's visiting controller device 1330 if the previously recorded grant does not include permission to change the temperature. Otherwise, if the previously recorded grant does not include permission to change the temperature, the local bus node 1342 on the controllee device 1340 may communicate with an appropriate application 1344 to perform the temperature change method call and then send an acknowledgement and any appropriate return values to the application 1334 on Jan's visiting controller device 1330.

Referring now to FIG. 13B, the interactions shown therein may be generally similar to the interactions described above with respect to FIG. 13A except that the trust model 1320 may be leveraged to apply a known or learned relationship between Jill and Jack, who is included in the family group. Accordingly, Jill may use her functional access application 1330 to call a GetFamily( ) method 1322 and request the GUIDs associated with each member in the family group, whereby rather than selecting a permission or role to grant to an individual user, Jill may select a permission or role to grant to the family group and thereby select a permission or role to grant to the GUID associated with each member in the family group. Likewise, rather than recording the grant under the GUID associated with the individual user, the controllee device 1340 may record the grant under the GUIDs associated with each family member. In this manner, Jill may use the functional access application 1330 to identify family members and consolidate various possible functionalities into a preferred settings profile that may be associated with all users that are currently members in the family group and/or may subsequently become members in the family group.

For example, referring now to FIG. 13C, the interactions shown therein may be generally similar to the interactions described above with respect to FIG. 13B except that a GetProfiles( ) method 1324 may be further used in the trust model 1320 to simplify the manner in which various functionalities may be consolidated into a learned cultural functionality that may be associated with all users that are currently members and/or may subsequently become members in a particular group. For example, subsequent to retrieving the GUIDs associated with each member in the family group, Jill may use the functional access application 1330 to retrieve learned cultural functionalities that are associated with the controllee device 1340 using a call to the GetProfiles( ) method 1324. Accordingly, Jill may select a cultural functionality to grant to the family group and thereby grant various consolidated functionalities to the GUIDs associated with each member in the family group and the controllee device 1340 may similarly the granted cultural functionality under the GUIDs associated with each family member. As such, when the controllee device 1340 receives a request from a particular user attempting to initiate a particular method call, the controllee device 1340 may query the GetProfiles( ) 1324 to retrieve action definition translations from the trust model 1320 (e.g., as shown in FIG. 12B) and thereby determine the appropriate method call to invoke. For example, if Jack initiates a secure call to change the temperature, the controllee device 1340 may query the GetProfiles( ) 1324 to translate a Summer profile to an action definition that sets the air conditioning unit to cool and a fan speed to high and then perform the action definition call.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for discovering, configuring, and leveraging relationships in Internet of Things (IoT) networks, comprising:
   registering, by a processor of a supervisor device of an IoT network, one or more objects into the IoT network;
   forming, by the processor, the one or more registered objects into one or more IoT groups based on usage associated with the one or more registered objects and interactions among the one or more registered objects;
   inferring, by the processor, a relationship between an owner user associated with the IoT network and a visitor user to the IoT network based on attributes of one or more interactions between at least one device associated with the visitor user and at least one of the one or more registered objects in the IoT network, wherein the processor obtains the attributes from the at least one of the one or more registered objects in the IoT network, and wherein the attributes include at least an identifier of the at least one device associated with the visitor user, times when the one or more interactions occurred, and locations where the one or more interactions occurred;
   assigning, by the processor, an identifier to the inferred relationship between the owner user and the visitor user based on one or more of the times when the one or more interactions occurred or the locations where the one or more interactions occurred; and
   controlling, by the processor, access that the at least one device associated with the visitor user has to each of the one or more IoT groups according to one or more permissions associated with the identifier assigned to the relationship between the owner user and the visitor user.

2. The method recited in claim 1, further comprising dividing the one or more IoT groups into one or more subsets according to the usage associated with the one or more registered objects and the interactions among the one or more registered objects.

3. The method recited in claim 1, wherein the one or more registered objects include at least one non-communicating physical object and at least one communicating IoT device that stores information relating to the usage and the interactions associated therewith in a local database.

4. The method recited in claim 3, further comprising:
   receiving, from the at least one communicating IoT device, the information relating to the usage and the interactions associated therewith; and
   deriving information relating to the usage and the interactions associated with the at least one non-communicating physical object based on the information received from the at least one communicating IoT device in response to the interactions associated with the at least one communicating IoT device including at least one interaction between the at least one communicating IoT device and the at least one non-communicating physical object.

5. The method recited in claim 1, wherein the interactions among the one or more registered objects include at least one interaction between a first IoT device and a second IoT device, and wherein the method further comprises:
   assigning a rank to a relationship between the first IoT device and the second IoT device based on one or more attributes associated with the at least one interaction and one or more attributes associated with the second IoT device;
   determining whether to grant the second IoT device access to the first IoT device based on the ranked relationship between the first IoT device and the second IoT device.

6. The method of claim 5, further comprising updating the rank assigned to the relationship between the first IoT device and the second IoT device based on the one or more attributes associated with the at least one interaction, the one or more attributes associated with the second IoT device, and one or more attributes associated with one or more previous interactions between the first IoT device and the second IoT device.

7. The method of claim 5, wherein the first IoT device belongs to the owner user associated with the IoT network and the second IoT device belongs to the visitor user.

8. The method of claim 7, further comprising determining whether to grant the second IoT device access to another IoT device that belongs to the owner user based on the rank assigned to the relationship between the first IoT device and the second IoT device.

9. The method recited in claim 1, wherein the one or more interactions between the at least one device associated with the visitor user and the one or more registered objects in the IoT network include at least one interaction between a first IoT device that belongs to the owner user associated with the IoT network and a second IoT device that belongs to the visitor user, and wherein the method further comprises:
   storing information related to the at least one interaction in a first interaction table associated with the first IoT device, wherein the information stored in the interaction table comprises one or more of the time when the at least one interaction occurred or the location where the at least one interaction occurred; and
   assigning the identifier to the inferred relationship between the owner user and the visitor user associated with the second IoT device based, at least in part, on the information stored in the first interaction table.

10. The method of claim 9, wherein the at least one interaction occurs while the first IoT device and the second IoT device are located in proximity to each other.

11. The method of claim 10, wherein the first IoT device detects the at least one interaction in response to detecting the second IoT device in proximity thereto.

12. The method of claim 10, wherein a server detects the at least one interaction based on location information related to the at least one interaction that the server receives from the first IoT device and the second IoT device.

13. The method of claim 9, wherein the inferred relationship reflects multiple interactions between one or more IoT devices associated with the owner user and one or more IoT devices associated with the visitor user.

14. The method of claim 13, wherein the multiple interactions comprise one or more of interactions that occur within a threshold time period, interactions that occur at substantially the same time, interactions that occur at substantially the same location, interactions that have a threshold duration, interactions that have a threshold frequency, or interactions that have substantially the same type.

15. The method recited in claim 1, further comprising:
tracking interactions among multiple IoT devices and locations where the tracked interactions occurred, wherein the multiple IoT devices are associated with at least the owner user associated with the IoT network and the visitor user, and wherein the tracked interactions include at least one of the one or more interactions between the at least one device associated with the visitor user and the one or more registered objects in the IoT network; and
discovering at least one asymmetric relationship between the owner user and the visitor user based on the tracked interactions and the locations associated therewith.

16. An apparatus, comprising:
at least one memory of a supervisor device of an Internet of Things (IoT) network; and
at least one processor of the supervisor device coupled to the at least one memory, the at least one memory and the at least one processor configured to:
register one or more objects into the IoT network;
form the one or more registered objects into one or more IoT groups according to usage associated with the one or more registered objects and interactions among the one or more registered objects;
infer a relationship between an owner user associated with the IoT network and a visitor user to the IoT network based on attributes of one or more interactions between at least one device associated with the visitor user and at least one of the one or more registered objects in the IoT network, wherein the processor obtains the attributes from the at least one of the one or more registered objects in the IoT network, and wherein the attributes include at least an identifier of the at least one device associated with the visitor user, times when the one or more interactions occurred, and locations where the one or more interactions occurred;
assign an identifier to the inferred relationship between the owner user and the visitor user based on one or more of the times when the one or more interactions occurred or the locations where the one or more interactions occurred; and
control access that the at least one device associated with the visitor user has to each of the one or more IoT groups according to one or more permissions associated with the identifier assigned to the relationship between the owner user and the visitor user.

17. The apparatus recited in claim 16, wherein the at least one memory and the at least one processor are further configured to divide the one or more IoT groups into one or more subsets according to the usage associated with the one or more registered objects and the interactions among the one or more registered objects.

18. The apparatus recited in claim 16, further comprising:
a transceiver configured to receive, from at least a first IoT device among the one or more registered objects that has communication capabilities, information relating to the usage and interactions associated with the first IoT device, wherein the at least one memory and the at least one processor are further configured to derive information relating to the usage and interactions associated with at least a second IoT device among the one or more registered objects that does not have communication capabilities based on the information received from the first IoT device in response to the interactions associated with the first IoT device including at least one interaction between the first IoT device and the second IoT device.

19. The apparatus recited in claim 16, wherein the at least one memory and the at least one processor are further configured to:
assign a rank to a relationship between a first IoT device among the one or more registered objects and a second IoT device among the one or more registered objects based on one or more attributes associated with at least one interaction between the first IoT device and the second IoT device and one or more attributes associated with the second IoT device; and
determine whether to grant the second IoT device access to the first IoT device based on the ranked relationship between the first IoT device and the second IoT device.

20. The apparatus of claim 19, wherein the at least one memory and the at least one processor are further configured to update the rank assigned to the relationship between the first IoT device and the second IoT device based on the one or more attributes associated with the at least one interaction, the one or more attributes associated with the second IoT device, and one or more attributes associated with one or more previous interactions that have occurred between the first IoT device and the second IoT device.

21. The apparatus of claim 19, wherein the first IoT device belongs to the owner user associated with the IoT network and the second IoT device belongs to the visitor user, and wherein the at least one memory and the at least one processor are further configured to determine whether to grant the second IoT device access to a third IoT device that belongs to the owner user based on the rank assigned to the relationship between the first IoT device and the second IoT device.

22. The apparatus recited in claim 16, wherein the one or more interactions between the at least one device associated with the visitor user and the one or more registered objects in the IoT network include at least one interaction between a first IoT device that belongs to the owner user associated with the IoT network and a second IoT device that belongs to the visitor user, and wherein the at least one memory and the at least one processor are further configured to:
assign the identifier to the inferred relationship between the owner user and the visitor user based, at least in part, on information related to the at least one interaction, wherein the information related to the at least one interaction comprises one or more of the time when the at least one interaction occurred or the location where the at least one interaction occurred.

23. The apparatus of claim 22, wherein the inferred relationship reflects multiple interactions between one or more IoT devices associated with the owner user and one or more IoT devices associated with the visitor user.

24. The apparatus recited in claim 16, wherein the at least one memory and the at least one processor are further configured to:
track interactions among multiple IoT devices and locations where the tracked interactions occurred, wherein the multiple IoT devices are associated with at least the owner user associated with the IoT network and the visitor user, and wherein the tracked interactions include at least one of the one or more interactions between the at least one device associated with the visitor user and the one or more registered objects in the IoT network; and discover at least one asymmetric relationship between the owner user and the visitor user based on the tracked interactions and the locations associated therewith.

25. An apparatus, comprising:

means for storing of a supervisor device of an Internet of Things (IoT) network; and means for processing of the supervisor device coupled to the means for storing, the means for storing and the means for processing configured to:

register one or more objects into the IoT network;

form the one or more registered objects into one or more IoT groups according to usage associated with the one or more registered objects and interactions among the one or more registered objects;

infer a relationship between an owner user associated with the IoT network and a visitor user to the IoT network based on attributes of one or more interactions between at least one device associated with the visitor user and at least one of the one or more registered objects in the IoT network, wherein the processor obtains the attributes from the at least one of the one or more registered objects in the IoT network, and wherein the attributes include at least an identifier of the at least one device associated with the visitor user, times when the one or more interactions occurred, and locations where the one or more interactions occurred;

assign an identifier to the inferred relationship between the owner user and the visitor user based on one or more of the times when the one or more interactions occurred or the locations where the one or more interactions occurred; and control access that the at least one device associated with the visitor user has to each of the one or more IoT groups according to one or more permissions associated with the identifier assigned to the relationship between the owner user and the visitor user.

26. A non-transitory computer-readable storage medium having computer-executable instructions recorded thereon, the computer-executable instructions configured to cause one or more processors of a supervisor device of an Internet of Things (IoT) network to:

register one or more objects into the IoT network;

form the one or more registered objects into one or more IoT groups according to usage associated with the one or more registered objects and interactions among the one or more registered objects;

infer a relationship between an owner user associated with the IoT network and a visitor user to the IoT network based on attributes of one or more interactions between at least one device associated with the visitor user and at least one of the one or more registered objects in the IoT network, wherein the processor obtains the attributes from the at least one of the one or more registered objects in the IoT network, and wherein the attributes include at least an identifier of the at least one device associated with the visitor user, times when the one or more interactions occurred, and locations where the one or more interactions occurred;

assign an identifier to the inferred relationship between the owner user and the visitor user based on one or more of the times when the one or more interactions occurred or the locations where the one or more interactions occurred; and control access that the at least one device associated with the visitor user has to each of the one or more IoT groups according to one or more permissions associated with the identifier assigned to the relationship between the owner user and the visitor user.

* * * * *